(12) United States Patent
Breternitz, Jr. et al.

(10) Patent No.: US 9,817,644 B2
(45) Date of Patent: Nov. 14, 2017

(54) APPARATUS, METHOD, AND SYSTEM FOR PROVIDING A DECISION MECHANISM FOR CONDITIONAL COMMITS IN AN ATOMIC REGION

(71) Applicant: Intel Corporation, Santa Clara, CA (US)

(72) Inventors: Mauricio Breternitz, Jr., Austin, TX (US); Youfeng Wu, Palo Alto, CA (US); Cheng Wang, San Ramon, CA (US); Edson Borin, San Jose, CA (US); Shiliang Hu, Los Altos, CA (US); Craig B. Zilles, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/867,950

(22) Filed: Sep. 28, 2015

(65) Prior Publication Data

US 2016/0019038 A1 Jan. 21, 2016

Related U.S. Application Data

(63) Continuation of application No. 13/893,238, filed on May 13, 2013, now Pat. No. 9,146,844, which is a (Continued)

(51) Int. Cl.
*G06F 9/45* (2006.01)
*G06F 9/30* (2006.01)
(Continued)

(52) U.S. Cl.
CPC ............... *G06F 8/443* (2013.01); *G06F 8/52* (2013.01); *G06F 9/3004* (2013.01);
(Continued)

(58) Field of Classification Search
CPC ..... G06F 9/3842; G06F 8/4441; G06F 8/4443
(Continued)

(56) References Cited

U.S. PATENT DOCUMENTS

| 8,549,504 B2 * | 10/2013 | Breternitz, Jr. | ..... G06F 9/30072 717/153 |
| 9,146,844 B2 * | 9/2015 | Breternitz | ........... G06F 9/30072 |

(Continued)

*Primary Examiner* — John Chavis
(74) *Attorney, Agent, or Firm* — Barnes & Thornburg LLP

(57) ABSTRACT

An apparatus and method is described herein for conditionally committing and/or speculative checkpointing transactions, which potentially results in dynamic resizing of transactions. During dynamic optimization of binary code, transactions are inserted to provide memory ordering safeguards, which enables a dynamic optimizer to more aggressively optimize code. And the conditional commit enables efficient execution of the dynamic optimization code, while attempting to prevent transactions from running out of hardware resources. While the speculative checkpoints enable quick and efficient recovery upon abort of a transaction. Processor hardware is adapted to support dynamic resizing of the transactions, such as including decoders that recognize a conditional commit instruction, a speculative checkpoint instruction, or both. And processor hardware is further adapted to perform operations to support conditional commit or speculative checkpointing in response to decoding such instructions.

20 Claims, 22 Drawing Sheets

Related U.S. Application Data continuation of application No. 12/890,639, filed on Sep. 25, 2010, now Pat. No. 8,549,504.

(51) Int. Cl.
    *G06F 9/38*     (2006.01)
    *G06F 9/46*     (2006.01)
    *G06F 11/36*     (2006.01)

(52) U.S. Cl.
    CPC ...... *G06F 9/30072* (2013.01); *G06F 9/30087* (2013.01); *G06F 9/30116* (2013.01); *G06F 9/3842* (2013.01); *G06F 9/3857* (2013.01); *G06F 9/466* (2013.01); *G06F 11/3672* (2013.01); *G06F 11/3688* (2013.01)

(58) Field of Classification Search
    USPC .......................................................... 717/154
    See application file for complete search history.

(56) References Cited

U.S. PATENT DOCUMENTS

| | | | |
|---|---|---|---|
| 9,146,950 B1* | 9/2015 | Cooley | G06F 21/56 |
| 2012/0079245 A1* | 3/2012 | Wang | G06F 9/30072 |
| | | | 712/208 |
| 2013/0318507 A1* | 11/2013 | Breternitz, Jr. | G06F 9/30072 |
| | | | 717/129 |

* cited by examiner

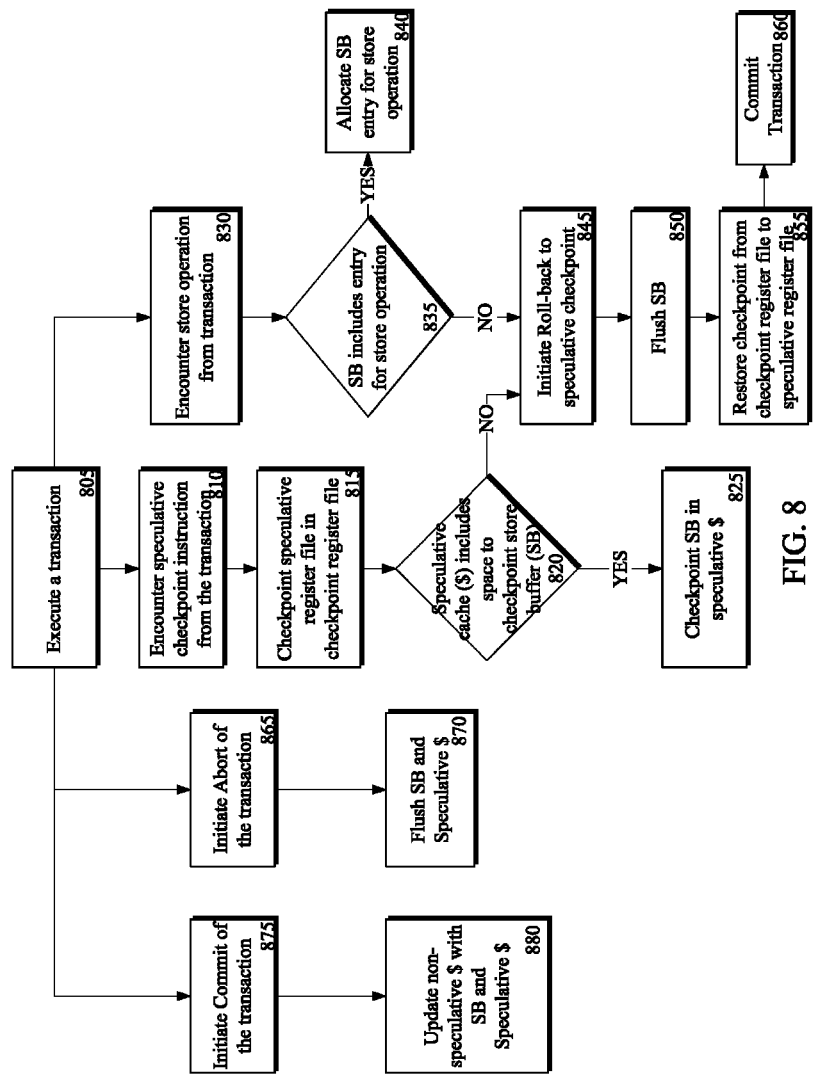

Pseudo Code A: An embodiment of single threaded code optimization

Pseudo Code B: Pseudo code region to be optimized

Pseudo Code C: Code region with start and commit atomic region instructions inserted

Pseudo Code D: Code region with conditional commit code inserted

Pseudo Code E: Code region after optimization

Pseudo Code F: Code region to be optimized

Pseudo Code G: Code region after speculative checkpoint code is inserted

Pseudo Code H: Code region to be optimized

Pseudo Code I: Pairing of a branch instruction with a speculative checkpoint instruction

Pseudo Code J: Combining a branch with a speculative checkpoint instruction

Pseudo Code K: Combination of speculative checkpoint and conditional commit

Pseudo Code L: Conditional commit aware of a speculative checkpoint

Pseudo Code M: One instruction for speculative checkpoint and conditional commit Pseudo Code N: Optimized code including a single instruction for speculative checkpoint and conditional commit

Pseudo Code O: Code region after optimization

APPARATUS, METHOD, AND SYSTEM FOR PROVIDING A DECISION MECHANISM FOR CONDITIONAL COMMITS IN AN ATOMIC REGION

CROSS-REFERENCE TO RELATED APPLICATION

This application is a continuation application of U.S. application Ser. No. 13/893,238, entitled "APPARATUS, METHOD, AND SYSTEM FOR PROVIDING A DECISION MECHANISM FOR CONDITIONAL COMMITS IN AN ATOMIC REGION," now U.S. Pat. No. 9,146,844, which was filed on May 13, 2013 and which is a continuation application of U.S. application Ser. No. 12/890,639, entitled "APPARATUS, METHOD, AND SYSTEM FOR PROVIDING A DECISION MECHANISM FOR CONDITIONAL COMMITS IN AN ATOMIC REGION," now U.S. Pat. No. 8,549,504, which was filed on Sep. 25, 2010.

FIELD

This invention relates to the field of processors and, in particular, to code optimization and execution on processors.

BACKGROUND

Advances in semi-conductor processing and logic design have permitted an increase in the amount of logic that may be present on integrated circuit devices. Previously, on single thread processors, optimization of code, such as binary code, was allowed to be overly aggressive, because there was no fear of interference by other threads of execution. Yet, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. This evolution from single threaded processors to more parallel, multi-threaded execution has resulted in limits to code optimization.

For example, Pseudo Code A (see FIG. 12a) illustrates optimization of binary code where the loads from memories at [r2] and [r2+4] are hoisted out of a loop to a header block (B3) by Partial Redundancy Load Elimination (PRLE) optimization. And the store to memory at [r2+4] is sunk out of the loop to a tail block (B4) by Partial Dead Store Elimination (PDSE) optimization. This optimization may work in a single threaded environment. However, in multi-threaded applications other threads may write to/read from memory at [r2] or [r2+4] during the loop execution, which potentially results in invalid execution due to the change in the execution order of the memory operations.

BRIEF DESCRIPTION OF THE DRAWINGS

The present invention is illustrated by way of example and not intended to be limited by the figures of the accompanying drawings.

FIG. 8 illustrates an embodiment of a flow diagram for a method of speculatively checkpointing memory during execution of a transaction.

DETAILED DESCRIPTION

In the following description, numerous specific details are set forth such as examples of specific types of processor cores, specific processor configurations, specific instruction types, specific hardware structures, specific code optimization techniques, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described algorithms, specific code implementations, specific compiler details, and other specific operational details of microprocessors haven't been described in detail in order to avoid unnecessarily obscuring the present invention.

The method and apparatus described herein are for optimizing code utilizing dynamically sized transactions based on hardware constraints. Specifically, optimization of code is discussed with regard to speculative checkpointing and/or conditional commit of transactions utilizing hardware constraints. Yet, the apparatus' and methods described herein are not so limited, as they may be implemented in any form of dynamically sized transaction. For example, the optimization of code may be performed statically or dynamically, as well as within hardware, software, or a combination thereof.

Figure 1:
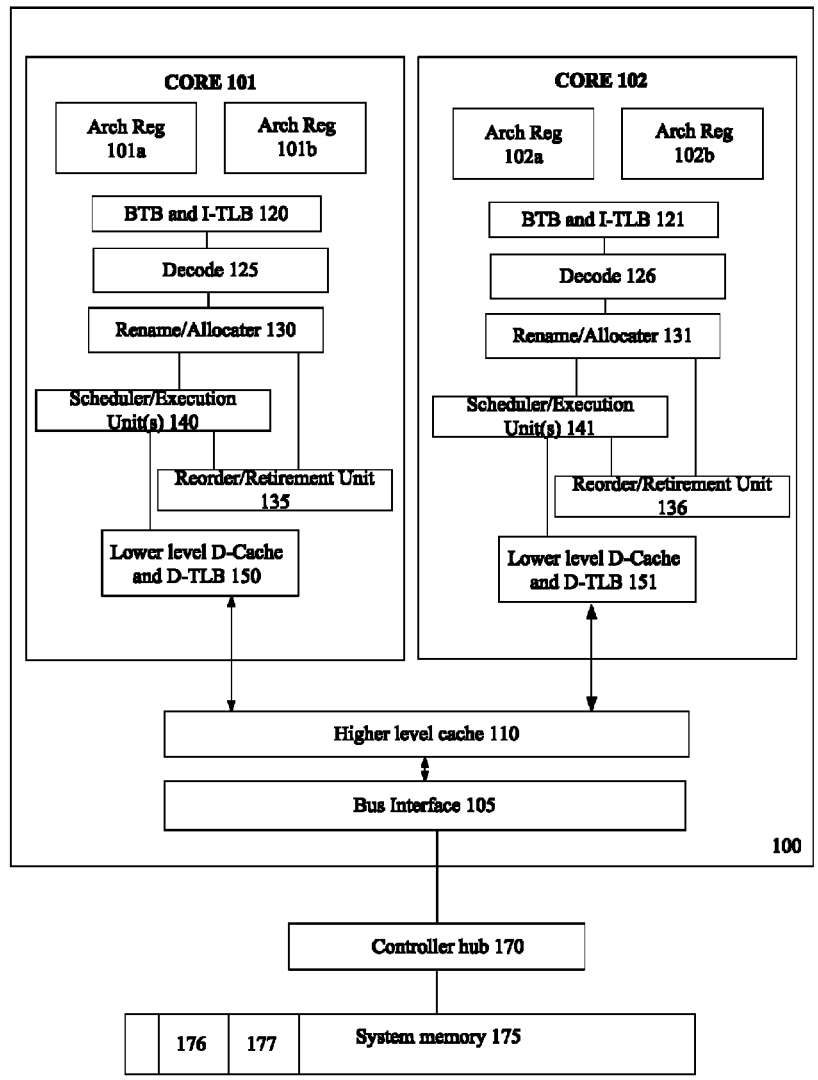
FIG. 1 illustrates an embodiment of a logical representation of a multiprocessing element processor adapted to support atomic execution and dynamic resizing of atomic regions.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102, which may include asymmetric cores or symmetric cores (illustrated embodiment). However, processor 100 may include any number of processing elements that may be symmetric or asymmetric.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e. four logical processors or processing elements capable of executing four software threads concurrently. As eluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in rename allocater logic 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific, new instructions, such as a conditional commit instruction and/or a speculative checkpoint instruction. As a result or the recognition by decoders 125, the architecture or core 101 takes specific, predefined actions to perform tasks associated with the appropriate instruction.

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

In one embodiment, processor 100 is capable of hardware transactional execution, software transactional execution, or a combination or hybrid thereof. A transaction, which may also be referred to as a critical or atomic section/region of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible. However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least primarily through execution of software code. In one embodiment, processor 100 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures, resources, and implementations are disclosed for illustrative purposes. Yet, it should be noted that these structures and implementations are not required and may be augmented and/or replaced with other structures having different implementation details.

As a combination, processor 100 may be capable of executing transactions within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. Furthermore, it is important to note that the same hardware may also be utilized to support and accelerate a pure STM system.

As stated above, transactions include transactional memory accesses to data items both by local processing elements within processor 100, as well as potentially by other processing elements. Without safety mechanisms in a transactional memory system, some of these accesses would potentially result in invalid data and execution, i.e. a write to data invalidating a read, or a read of invalid data. As a result, processor 100 potentially includes logic to track or monitor memory accesses to and from data items for identification of potential conflicts, such as read monitors and write monitors, as discussed below.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A.

For example, an expression may be couched as a.x=a.y+a.z. Here, field y and field z are loaded to be added and the result is to be written to field x.

Therefore, monitoring/buffering memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, processor 100 includes monitors to detect or track accesses, and potential subsequent conflicts, associated with data items. As one example, hardware of processor 100 includes read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately.

As a specific illustrative example, read and write monitors include attributes associated with cache locations, such as locations within lower level data cache 150 (which may include a speculative cache), to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction. Examples of factors, which may be considered for non-commit of a transaction includes detecting a conflict to a transactionally accessed memory location, losing monitor information, losing buffered data, losing metadata associated with a transactionally accessed data item, and detecting an other invalidating event, such as an interrupt, ring transition, or an explicit user instruction.

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads.

In contrast, as another example, a cache memory, such as data cache 150, is utilized to buffer the updates, while providing the same transactional functionality. Here, cache 150 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item—data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e. not made globally visible, until after commit. Instead, the transaction may abort or the evicted line may be stored in a speculative structure between the data cache and the higher level cache memories, such as a victim cache. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

In one embodiment, processor 100 is capable of executing a compiler/optimization code 177 to compile application code 176 to support transactional execution, as well as to potentially optimize application code 176. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization. As described herein, the marriage of transactional execution and dynamic code compilation potentially results in enabling more aggressive optimization, while retaining necessary memory ordering safeguards.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Nevertheless, despite the execution environment and dynamic or static nature of a compiler, the compiler, in one embodiment, compiles program code to enable transactional execution and/or optimize sections of program code. Therefore, reference to execution of program code, in one embodiment, refers to: (1) execution of a compiler program(s) or optimization code optimizer, either dynamically or statically, to compile main program code, to maintain transactional structures, to perform other transaction related operations, or to optimize code; (2) execution of main program code including transactional operations/calls, such as application code that has been optimized/compiled; (3) execution of other program code, such as libraries, associated with the main program code, or (4) a combination thereof.

Often within software transactional memory (STM) systems, a compiler will be utilized to insert some operations, calls, and other code inline with application code to be compiled, while other operations, calls, functions, and code are provided separately within libraries. This potentially provides the ability of the libraries distributors to optimize and update the libraries without having to recompile the application code. As a specific example, a call to a commit function may be inserted inline within application code at a commit point of a transaction, while the commit function is separately provided in an updateable library. Additionally, the choice of where to place specific operations and calls potentially affects the efficiency of application code.

As stated above in the background section, aggressive optimization of code in a multi-threaded system is potentially dangerous with regard to memory ordering issues. However, in one embodiment, code optimization is combined with transactional memory safeguards to allow for aggressive optimization, while retaining memory ordering safeguards. Here, an atomic region including optimized code may be inserted into program code, such that upon execution of the optimized code the transactional safeguards ensure no memory ordering violation. As a result, the optimized code is able to be aggressively optimized, and the atomic region ensures that memory ordering violations are detected so not to commit the region.

Yet, combination of atomic regions with code optimization may also benefit from further modification. Therefore, in one embodiment, processor 100 is capable of dynamically resizing transactions within program code 176 based on the availability of hardware resources within processor 100. Traditionally, either an atomic region is either fully committed or aborted. However, in this example, a transaction may be committed before an endpoint of the transaction, i.e. dynamically resized to a smaller transaction, when low or insufficient resources exist to complete execution of the transaction (or a portion of code within the transaction). As an illustrative example, assume cache memory 150 is utilized to hold tentative, transactional information along with associated transactional tracking information. In this scenario, when cache 150 becomes low on available cache entries or overflows (selects a transactionally accessed line for eviction and the victim cache is full), the executing transaction may be committed at that point, which causes the tentative information to become globally visible. A new transaction may then be restarted from the commit point to the original transaction's endpoint. Consequently, the transactional hardware resources—cache memory 150 in this example—is freed. And the transaction is able to complete as two smaller hardware transactions, instead of rolling back the entire transactions or extending the transaction into software, such as in a UTM system.

Therefore, in one embodiment, processor 100 includes hardware to support a transactional memory system, whether it be an HTM, STM, or UTM, such as any combination of decoders, cache memories, speculative storage structures, tracking mechanisms, store buffers, register files, checkpoint storage mechanisms, and any other known hardware to support execution of a transaction. Furthermore, processor 100 also includes hardware/logic adapted to track, provide, or indicate an availability, usage, or representation thereof for such hardware to support transactional execution. As a first example, a usage metric (representation of hardware usage) includes a number of entries available, or inversely occupied, in a storage structure, such as a cache memory, victim cache, store buffer, or load buffer. As another example, a usage metric may include an occurrence of an event, such as an overflow of a memory, an interrupt event, or eviction of an entry. However, any usage metric, whether actual or abstract, may be utilized.

As an example of a more abstract usage metric, assume a counter counts a number of loop iterations within code, and when the counter hits a threshold the transaction is committed. Here, the threshold may be dynamically adjusted based on code profiling over time, such as reducing the threshold when an abort of a transaction occurs due to insufficient hardware resources. In that case, a precise, actual usage of the hardware resource or a specific event is not provided. However, through dynamic adjustment of the counter threshold, the hardware is essentially estimating a number of loops before hardware resources are exhausted, i.e. before an abort or roll-back is performed due to high resource utilization. As a result, in one embodiment, such hardware estimation is referred to as a usage or representation of usage for hardware resources, because it is estimating resource availability for code execution.

In one embodiment, hardware in processor 100 is capable of asynchronously determining when a transaction is to be dynamically resized. For example, when a hardware resource's utilization is high, processor 100 may commit the transaction and restart another transaction transparently from the perspective of program code 176 executing on processor 100. Here, program code 176 including a transaction is being executed by execution logic 140. And from the program code's perspective, the transaction is executed seamlessly. However, from the perspective of the hardware, a resource, such as a store buffer had high utilization (overflowed), so the hardware committed the transaction before an endpoint of the transaction, restarted a second transaction at that commit point, and then committed the second transaction at the original endpoint of the transaction.

In another embodiment, dynamic resizing of a transaction is performed with a combination of hardware and firmware/software. Here, processor 100 includes hardware resources to both support transactional execution and track utilization/availability of those resources. And conditional code from program code 176, when executed, is to cause the execution logic 140 to dynamically resize (commit the transaction before an endpoint) based on the utilization/availability of those hardware resources. Essentially, the check of the resource utilization and potential conditional commit is performed synchronously—as result of a software instruction—instead of independent from execution of a specific instruction (asynchronously) by the hardware.

For example, dynamic optimization code 177, which may be part of dynamic compiler code, is executed by execution logic 140/141 to dynamically compile/optimize program code 176 during runtime of processor 100. During such compilation/optimization, an atomic region is inserted in the section of program code 176 along with conditional commit code within that atomic region. Execution logic 140/141 is then dynamically optimizing code 176 and executing dynamically optimized code 176 during runtime. Specifically, execution logic 140/141 is executing the atomic region and the optimized code therein. In response to decode stage 125 encountering/decoding the conditional commit code, the hardware resource utilization is determined. Note that the utilization/availability may already be previously being tracked, but in response to the conditional commit code the utilization is then being reported/evaluated. A decision may then be made on whether to commit the atomic region based on the hardware resource availability/usage.

In one embodiment, the decision whether to commit based on resource usage is performed by hardware in response to the conditional code. In other words, the hardware may independently evaluate the hardware usage and determine if a utilization is high enough to cause an early commit. As an example, the conditional commit code includes a conditional commit instruction recognizable by decoders 125. The conditional commit instruction, or a region check instruction, includes a branch target address. And the hardware, in response to decoding the conditional commit instruction with decode logic 125, determines if the hardware resource utilization is too high, or alternatively insufficiently resources exist. If utilization is too high or insufficiently resources exist, then execution logic 140 jumps execution to the branch target address.

In one embodiment, hardware determines if utilization is too high or insufficient resources exist based on a predetermined algorithm. For example, when the hardware resources include a store buffer, a utilization being too high includes a predetermined number of store buffer entries being utilized or an overflow (no store buffer entries being available) occurring. The hardware may also estimate an expected usage of the code based on previous execution (code profiling), and utilize that estimation along with the current hardware usage to determine if sufficient resources exist to continue execution without a conditional commit.

Alternatively, the conditional commit instruction may also include an expected usage. And the hardware compares the expected usage to the hardware usage to determine if insufficient resources exist. For example, assume conditional code 176 is inserted in a loop within the atomic region of program code 176. As a result, the conditional code is executed upon every iteration of the loop. Here, the conditional commit instruction references an expected number of store buffer entries to be utilized during an iteration of the loop, which may be based on the number of unique store buffer entries to be touched as estimated by the code or by dynamic profiling of the code. In response to decode logic 125 decoding the conditional commit instruction, the expected number of entries is compared against a number of available entries in a store buffer as determined by hardware of processor 100. If the number of expected entries is greater than the number of available entries, then execution jumps to the branch target address referenced by the conditional commit instruction. The branch target address may include an address referencing code within program code 176 or other code, such as library code, to perform an early commit of the atomic region and restart a second atomic region.

In another embodiment, software determines when hardware utilization is too high, or hardware availability is too low. In this example, processor 100 includes a storage element, such as a register, that is to hold a representation of hardware usage (a hardware usage metric). Here, the conditional code includes operations to load/read the usage metric, evaluate it, and determine if an early commit is to be performed. If an early commit is to be performed, then the conditional code includes a jump operation, when executed by execution logic 140, to jump execution to a branch target address, which commits the current transaction and may start another atomic region.

Note that the hardware and software may perform similar evaluations. However, a hardware solution potentially enables code compactness through allowing hardware to either completely handle the early commit or only receive a conditional commit instruction. Yet, allowing software to perform the evaluation provides more flexibility in determining when to perform an early commit. As a result, any gradient of combination between hardware and software may be utilized to determine when hardware utilization/availability is too high/low based on the implementation and desired advantages.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. In addition, FIG. 1 only depicts two cores; yet, a processor may include any number of cores, such as multiple cores of the same type, as well as more than two cores that each differ in type.

FIG. 1 illustrates an embodiment of processor that is coupled in a point-to-point fashion with an interface to an external memory controller (controller hub 170). However, many current processors have begun including an on-processor memory interface module—an on-chip module—with a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor.

Figure 2A:
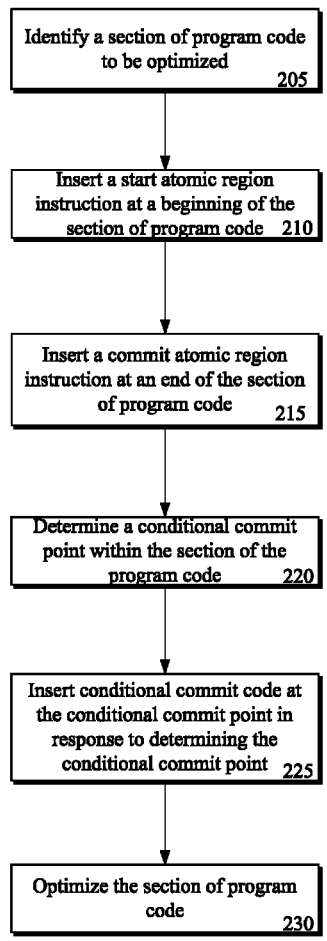
FIG. 2a illustrates an embodiment of a flow diagram for a method of optimizing code including providing for dynamic resizing of transactions based on hardware resource limitations.

Turning to FIG. 2a, an embodiment of a flow diagram for a method of optimizing code utilizing atomic regions is depicted. Although the blocks of the flow in FIG. 2a are illustrated in a substantially serial fashion, the flows of the illustrated method may be performed in any order, as well as partially or fully in parallel. For example, conditional commit code may be inserted before inserting atomic region start and end instructions. Furthermore, the depicted blocks are not required to be performed. And other blocks, not illustrated, may be performed in conjunction with or in place of the pictured blocks.

In block 205, a section of program code to be optimized is identified. As stated above program code may refer to compiler code, optimization code, application code, library code, or any other known formulation of code. As a specific illustrative example, program code includes code to be executed on processor 100, such as binary code that is ready for execution, dynamically compiled for execution on processor 100, and/or dynamically optimized to execute on processor 100. In addition, the insertion of code (operations, function calls, etc) and optimization of the code is performed though execution of program code, such as compiler and/or optimization code. As an example, optimization code is dynamically executed on processor 100 at runtime to optimize program code just before execution of the program code on processor 100.

Figure 12A:
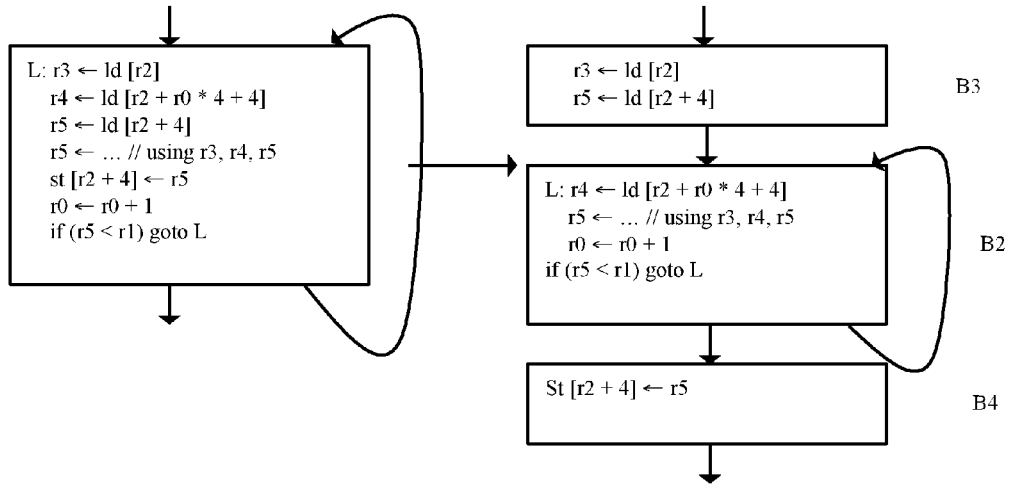
FIG. 12a illustrates example pseudocode of single threaded code optimization.
Figure 12B:
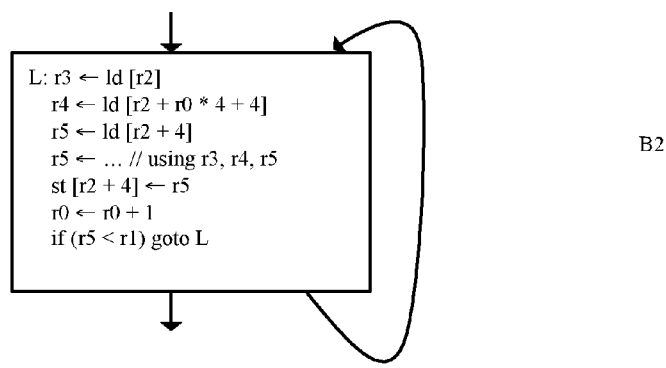
FIGS. 12b-12o illustrate example pseudocode of technologies disclosed herein.

In one embodiment, identifying a section of program code, such as the region from Pseudo Code B (see FIG. 12b), to be optimized includes the code indicating a section/region of program code to be optimized. For example, a specific instruction or demarcation is utilized to indicate a section of code to be optimized or would likely benefit from optimization. As another option, a programmer provides hints regarding sections of the program code, which are utilized by optimization code to identify sections for optimization. In another embodiment, a region is identified/selected based on profiling information. For example, program code is profiled during execution by hardware, software executing on the processor, firmware, or a combination thereof. Here, profiling of the code generates hints or modifies original software hints, as well as provide direct identification of regions for optimizations. In addition, a section of code is potentially identified by certain attributes, such as a specific type, format, or order of the code. As a specific illustrative example, code including loops are targeted for potential optimization. And profiling of the loops during execution determines which of the loops should be optimized. Also, if the loop includes specific code, such as loads and stores, that are to be optimized, then the region including such code is identified for optimization. As can be seen from Pseudo Code B, the region includes loads and stores that capable of being hoisted and sunk out of the loop to optimize loop execution.

Figure 12C:
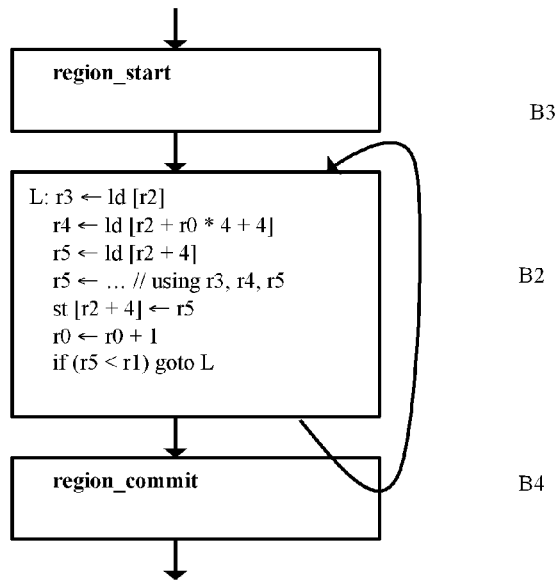

In one embodiment, the section of code identified for optimization is transformed into an atomic region. Or at least a portion of the section of code is transformed into the atomic region. Here, the portion of code is demarcated by start and end (commit) transaction (atomic region) instructions, as shown in blocks 210-215. As can be seen from Pseudo Code C (see FIG. 12c), a region start and a region commit instruction are inserted before and after the region of code, respectively. In one embodiment, the code includes multiple entries and multiple exits. As a result, a start atomic region and an end atomic region instruction may be inserted at each entry point and each exit point, respectively. However, any known method of indicating a region is atomic may be utilized.

In block 220, a conditional commit point is determined. Note that multiple conditional commit points may be determined/assigned within a region of code to be optimized, but for the ease of discussion only one commit point is discussed in more detail below. Determining a conditional commit point may be based on any known assignment/determination algorithm for attempting to avoid running out of hardware resources between conditional commit points. As a first example, a conditional commit point is inserted within the loop, such that the conditional commit point is encountered upon every iteration. Here, a conditional commit point is determined to be at the beginning of the loop. As another example, dynamic profiling of the code indicates execution paths that often result in running out of hardware resources. So, conditional commit points are assigned to such execution paths to avoid running out of resources during execution of those paths. Similarly, execution paths that are known to monopolize or be resource heavy may have conditional commit points assigned to them.

Figure 2B:
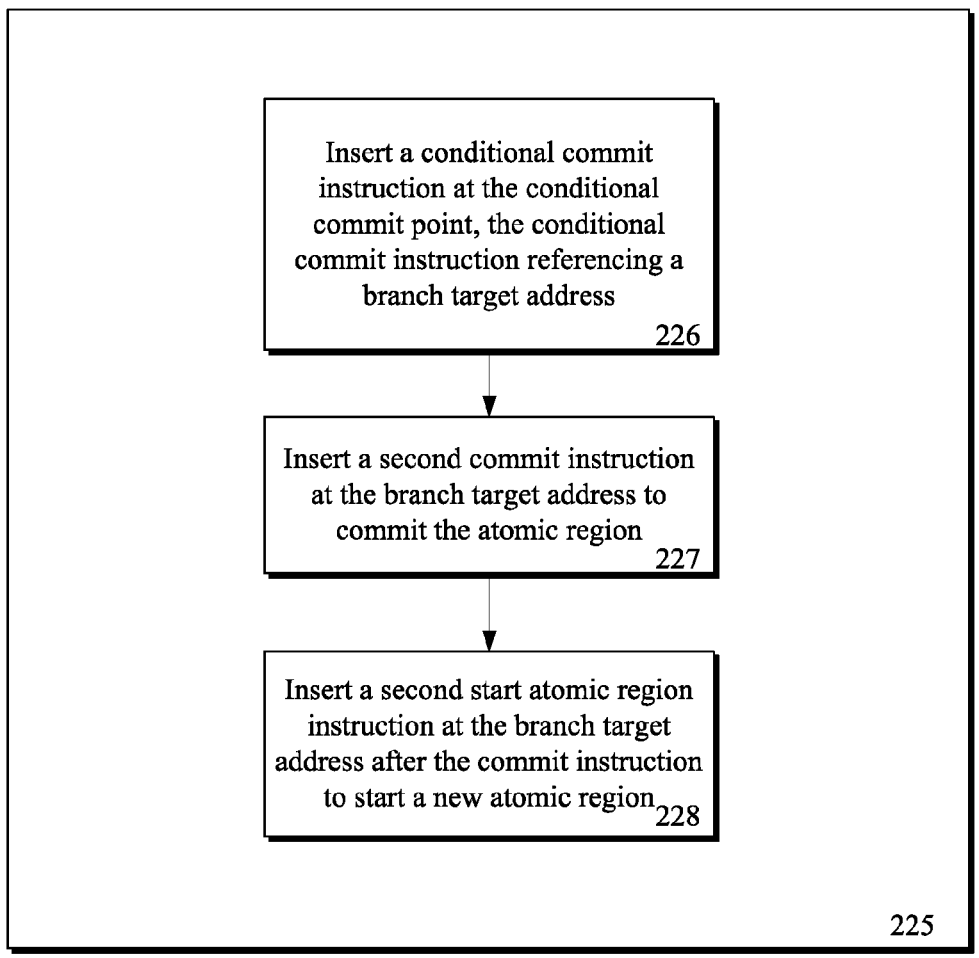
FIG. 2b illustrates an embodiment of FIG. 2a's flow diagram for inserting conditional commit code.
Figure 12D:
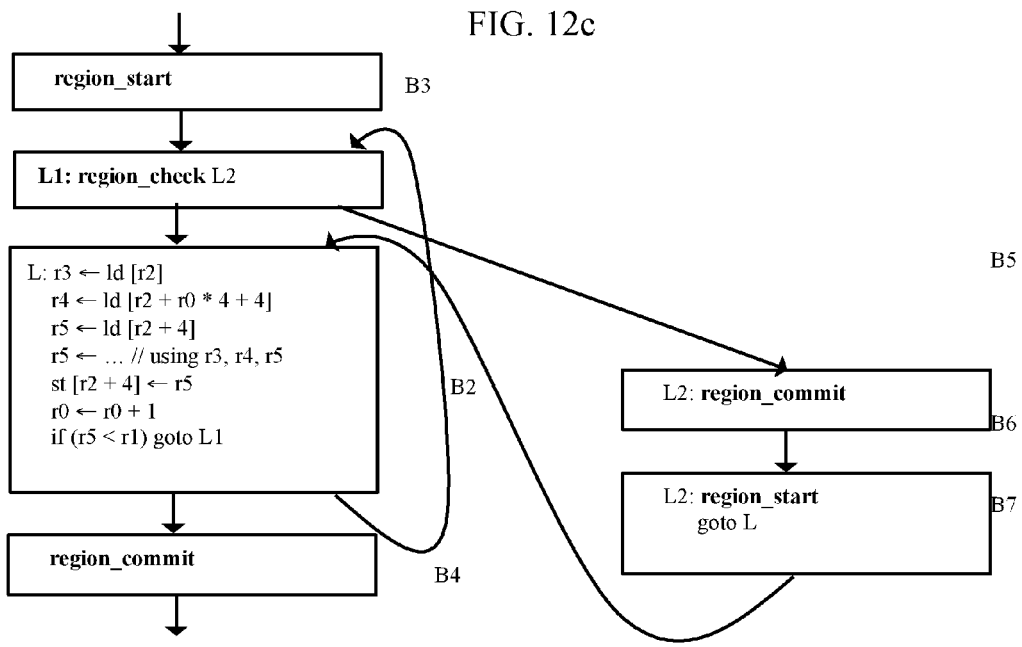

In block 225, conditional commit code is inserted at least at the conditional commit point. The conditional commit code is to cause a resize, i.e. early commit, of the transaction, if it is determined that insufficient hardware resources exist to support execution through to the next commit point. Turning briefly to FIG. 2b, an embodiment of a flow diagram for inserting conditional commit code is illustrated. In flow 226, a conditional commit instruction is inserted at the conditional commit point. As can be seen in Pseudo Code D (see FIG. 12d), a conditional commit instruction, in one embodiment, includes a region check instruction inserted at commit point L1 within the atomic region.

As a first example, a conditional commit instruction, such as a region check instruction or conditional branch instruction, includes a reference to a branch target address. And as a result of determining insufficient resources exist to support execution through to a next commit point, execution is to jump to the branch target address in response to the conditional commit instruction. Here, conditional commit code may also include commit code at the branch target address. Essentially, in this example, the conditional commit instruction is to initiate a test/query to determine if sufficient resources exist. And the code at the branch target address is to commit the transaction early when insufficient resources exist. Therefore, in block 227 a commit instruction is inserted at the branch target address.

In Pseudo Code D, a first region_commit instruction is inserted at the exit/end point of the atomic region at B4, while a second region_commit is inserted at branch target address point L2 in block B6. Here, if insufficient resources are determined in response to the region_check instruction at L1, then execution jumps to the branch target address (B6) referenced by the region_check instruction. The region_commit instruction, such as a call to a commit function within a transactional library or an architecturally recognized commit instruction, is executed to commit the atomic region early (before endpoint B4). And furthermore, in block 228 (B7 from Pseudo Code D), a second start atomic region instruction (region_start) is inserted after the region_commit instruction. As a result, execution of the atomic region begins at B3 (region_start). And continues until insufficient resources are determined by the region_check instruction at L1 or the endpoint B4 is encountered. However, if insufficient hardware resources are determined at L1, then the original transaction is resized, i.e. committed at commit point L2, B6. Then, a second atomic region is started at B7, and the region execution is continued as a second transaction until commit point B4 or resources are once again limited at L1. Therefore, a single atomic region may be dynamically resized into smaller transactions to avoid running out of hardware resources, which would previously cause an abort or extension into software transactional execution.

Note that a conditional commit instruction may include any information. For example, as previously described, a conditional commit instruction, in one embodiment, includes an expected hardware resource usage until the next commit point, such as an expected number of entries to be utilized during a loop through code B2 in Pseudo Code D. Here, this expected usage is utilized in determining if sufficient resources exist to support execution for another iteration of loop B2. As a specific illustrative example, the expected usage includes a number of entries in a storage structure expected to be uniquely touched in response to execution of the region of code until a next commit point.

Additionally, conditional code is not limited to a conditional commit instruction. For example, in an embodiment where hardware determines usage and places that usage in a register (discussed in more detail in reference to FIG. 5), the conditional code may include an operation to read/load the usage from the register, evaluate the usage, and then issue a jump or branch operation that branches to commit and restart code similar to B6 and B7 from Pseudo Code D. In other embodiments, software may estimate hardware usage, instead of communicating with or querying hardware. In that scenario, the conditional code includes code to perform such estimation. For example, a count, which is described in more detail in reference to FIG. 6, is kept through execution of software to limit the number of iterations of a loop before performing a conditional commit. In this example, the code to be executed to keep the count may be considered conditional commit code.

Figure 12E:
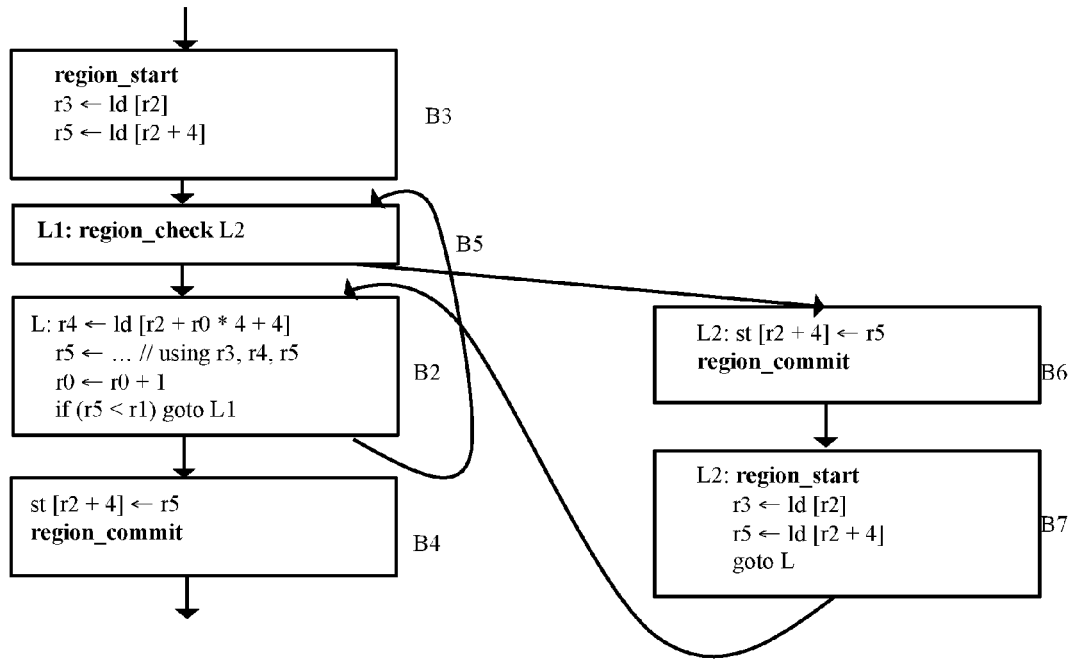
Figure 12F:
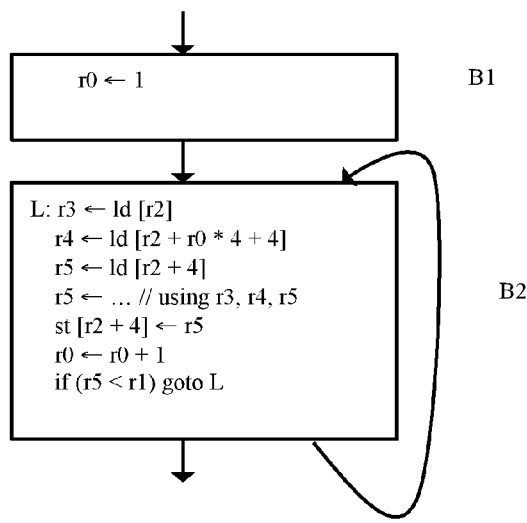

In block 230, the section of program code is optimized. Pseudo Code E (see FIG. 12e) depicts an example of code after optimization.

Although the demarcation of an atomic region and insertion of conditional commit code is considered optimizing program code in some embodiments, the section of program code is further optimized in other embodiments to obtain execution benefits, while relying on the memory ordering safeguards of transactional execution. As specific examples, loads and stores are hoisted and sunk outside of a loop utilizing Partial Redundancy Load Elimination (PRLE) and Partial Dead Store Elimination (PDSE). Pseudo Code E depicts the atomic region after PRLE hoisted the [r2] and [r2+4] loads and PDSE sunk the [r2+4] store. Note that in one embodiment further memory ordering rules are applied. Here, it may be advantageous to ensure that no memory optimization that violates memory ordering crosses region starts and commits. An example of this can be seen in Pseudo Code E, where the [r2+4] store is inserted before the region_commit at B6 and the [r2] and [r2+4] loads are re-inserted after the region_start instruction at B7. As a result, if the region is committed early (resized to the conditional commit point), the [r2+4] store is performed before the region is committed at B6. And the [r2] and [r2+4] loads are performed after a restart of the new transaction in B7.

Although load and store optimization has been explored above, any known code optimization techniques may be utilized. A few more examples of code optimization, which are a non-exhaustive list and purely illustrative, include: loop optimization, software pipelining, data-flow optimization, code generation optimization, bounds checking elimination, branch offset optimization, dead code elimination, and jump threading.

Figure 3A:
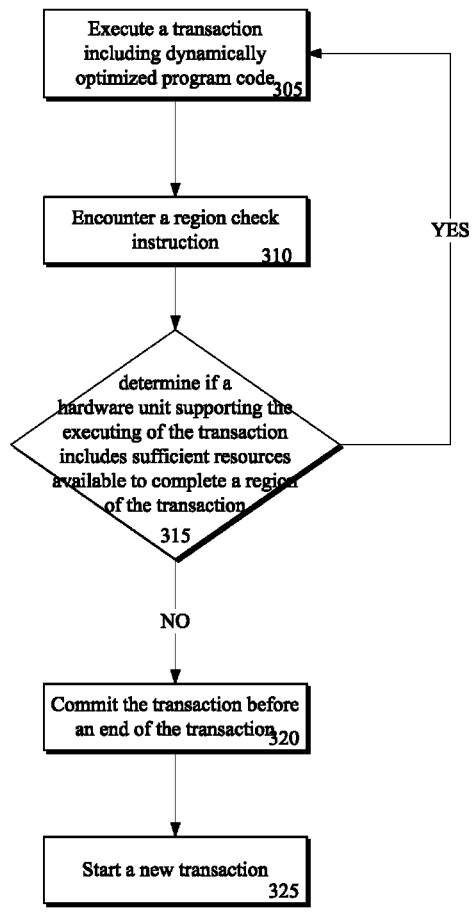
FIG. 3a illustrates an embodiment of a flow diagram for a method of dynamically resizing a transaction during execution.

Referring to FIG. 3a, an embodiment of a flow diagram for dynamically resizing atomic code is depicted. In block 305, a transaction (atomic region) including optimized program code is executed. In one embodiment, the optimized program code is dynamically optimized during runtime, i.e. dynamic optimization code is executed at runtime to optimize the program code "on the fly" just in time for execution. Often this type of dynamic optimization or compilation is not aware of the entire program, such as during static compilation, but is able to compile/optimize parts of code in sections.

In block 310, a region check instruction is encountered. In one embodiment, encountering a region check instruction includes decode logic decoding the instruction. However, encountering may refer to any stage of a pipeline receiving or servicing the instruction (or an operation of the instruction). For example, encountering a region check instruction may instead refer to allocation of an entry in a buffer for an operation associated with the instruction, dispatch of the operation, actual execution of the instruction with an execution unit to perform operations or micro-operations for the instruction, or any other known stage of a pipeline. As stated above, a region check instruction, in one embodiment, is part of an ISA recognizable by decoders of a processor to query hardware. The query may simply be a load to query hardware for usage. And then software determines if enough resources are available without any more involvement from hardware. In contrast, the query may include a request for the hardware to determine if sufficient resources exist to continue execution of the atomic region. Here, the query provides a target address that the hardware branches to if insufficient resources exist. Yet, the query may be more involved, where the region check instruction also provides expected usage for the hardware to utilize in determining if sufficient resources are available.

In response to the region check instruction, in block 315, it's determined, at a point for a region check, if a hardware unit(s) has sufficient resources to complete a region of a transaction, such as until a next conditional commit point. Determining whether sufficient hardware resources exist may be actually measured or approximated in any manner. As a first example, hardware itself tracks and/or determines usage level. And hardware, firmware, software, or a combination thereof determines if that usage level/metric includes enough availability to complete a region of the transaction. However, note that usage level may also be approximated/measured purely at the direction of software. In this case, the measurement may not be as accurate as the aforementioned example where hardware performs its own tracking, but additional hardware hooks do not have to be added to support measurement.

Figure 3B:
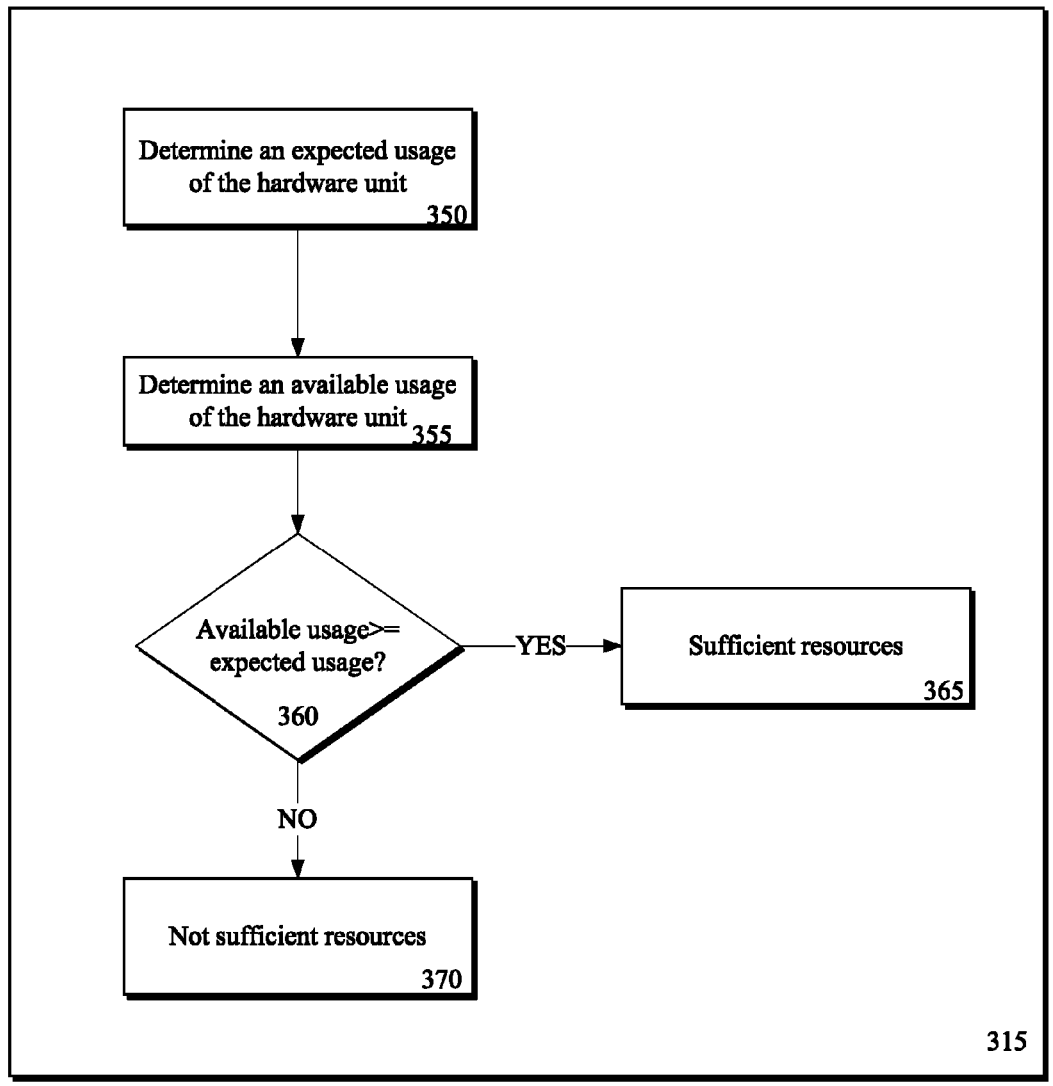
FIG. 3b illustrates an embodiment of FIG. 3a's flow diagram for determining if sufficient hardware resources exist at a conditional commit point to continue execution.

Referring temporarily to FIG. 3b, an embodiment of a flow diagram for determining if sufficient resources to complete execution of a region of a transaction is illustrated. In flow 350, an expected usage of a hardware unit, or multiple hardware units, is determined. Hardware, firmware, software, or a combination thereof may be utilized to determine an expected usage.

In one scenario, execution of the program code including the transaction is profiled. During the profiling, a number of aborts due to limited resources, commits without an abort, and/or hardware usage is tracked. And subsequently, code, such as a compiler, provides hints or suggestions of expected usage based on past execution profiles. In another scenario, expected usage may include an estimate. For example, if the hardware unit is a store buffer, an expected usage, in this situation, includes a number of unique stores (store operations likely to allocate in a new store buffer entry) in the code region. Essentially, the number of stores in code is estimating the number of store buffer entries to be utilized during execution of the code region. However, determining expected usage is not limited to software profiling or estimation. Instead, hardware may perform similar profiling or estimation, as well as work in conjunction with code to determine expected usage.

Similarly, in flow 355, an available usage of the hardware unit is determined either in hardware, software, firmware, or a combination thereof. Continuing the example from above, assume a conditional commit instruction informs hardware that an expected usage of a 32 entry store buffer includes ten store buffer entries based on estimation or past profiling. Then the store buffer, utilizing its head and tail pointers, is able to determine that 20 entries are currently allocated (12 available entries). From this determination, a comparison may be performed in flow 360. And since the number of available entries is greater than the expected usage, it's determined in flow 360 that sufficient resource exist to continue execution. Alternatively, if only nine entries are available, then it's determined that sufficient resources don't exist in flow 370.

However, the comparison is not limited to ensuring exactly enough space is available in a hardware resource. Instead, a buffer zone may be provided through use of thresholds. For example, if usage is high (above a threshold) or availability is low (below a threshold), then similar determinations may be made in flows 365, 370. As a specific illustrative example, assume a buffer zone of six entries is utilized for availability. In this case, if the number of expected entries to be utilized is ten and twenty are being utilized in the 32 entry buffer, then only twelve entries are available. So if the expected usage of ten entries were to be allocated, then only two entries would be left available. Since a buffer zone of six entries left available is being utilized, then insufficient resources are determine in flow 370. Instead, if twenty entries are available (only 12 entries being utilized), then sufficient resources exist (as in flow 365), because allocating ten entries for the code region would still leave ten available entries.

Additionally, usage and availability may take into account thread priority and usage. Here, if multiple threads shared access to a hardware resource, then the resource may be partitioned or fully shared. As a result, usage and availability in comparison to expected usage may take this sharing into account, so one thread doesn't monopolize a hardware resource (not leaving enough availability for another thread). For example, if two threads share access to a cache through partitioning, a transaction from one thread may be limited to half the entries of the cache. So, usage and availability is in regard to half of the cache, instead of the entire cache.

The discussion above has been in reference to a store buffer and briefly in reference to a cache; however, usage/availability may be in regards to any single or combination of hardware resource(s), such as a store buffer, load buffer, a cache memory, a victim cache, a register file, a queue, an execution unit, or other known processor hardware. For example, if the hardware resource includes a cache memory, the expected usage may include a number of cache lines to be touched/utilized; the usage may include a number of cache lines holding data or a number of cache lines in/not in a coherency state, such as a number of cache lines that are shared, exclusive, or modified, and an availability may include a number of available entries or lines in/not in a specific coherency state, such as an invalid coherency state. In addition, the availability/usage has further been discussed in reference to hardware measuring the availability/usage. However, as mentioned above, the usage and availability may be directly or indirectly measured, as well as estimated, by software, hardware, or a combination thereof.

Returning to FIG. 3a, if it's determined that there's sufficient resources to complete the region, the execution flow returns to flow 305. In other words, execution continues until the next conditional commit point; at which point the evaluation of hardware resources may be performed again. Yet, if sufficient resources are determined not to exist, then at flow 320 the transaction is committed before the end of the transaction (dynamically resized). And in one embodiment, to provide seamless execution, a new transaction is started in flow 325 to continue the atomic execution. Here, a single, larger transaction is essentially dynamically split into smaller transactions that may be handled by hardware without extension into virtual or system memory to provide more execution space.

Figure 4:
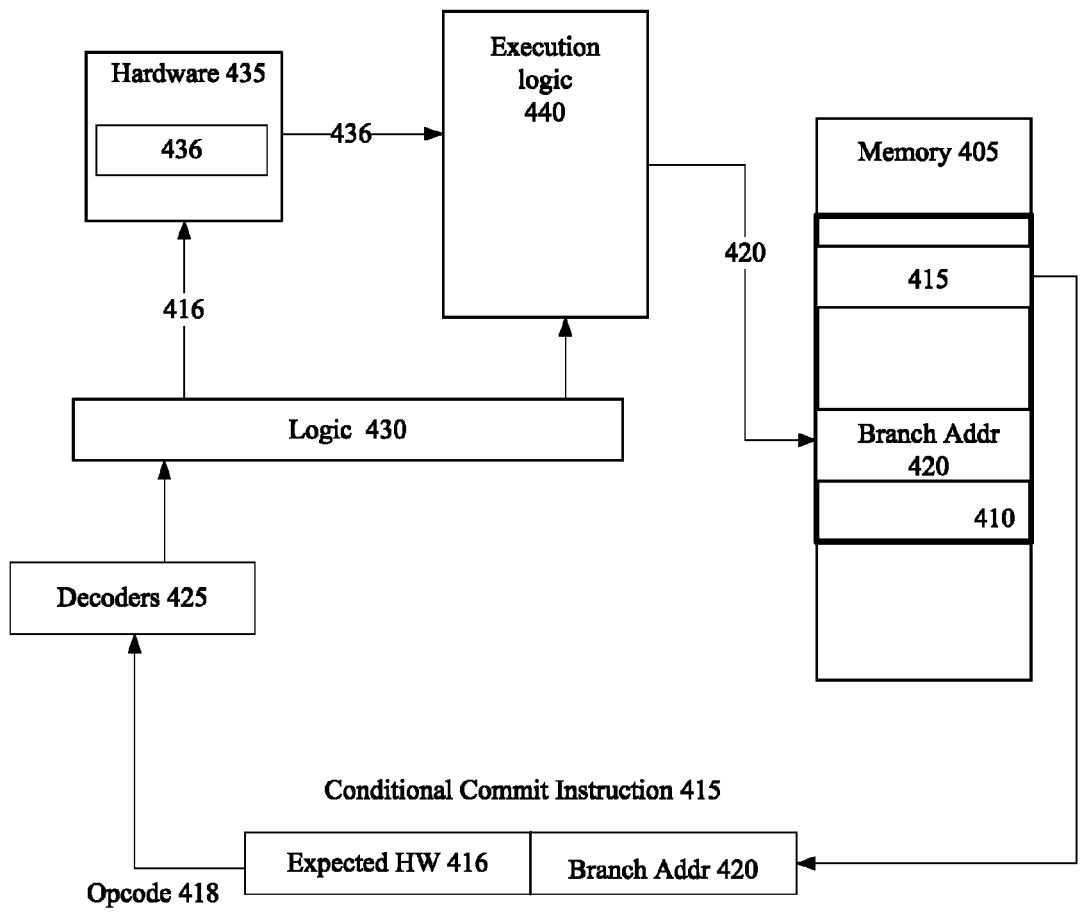
FIG. 4 illustrates an embodiment of a logical representation of hardware adapted to support dynamic resizing of transactions.

Turning to FIG. 4, an embodiment of logical blocks to support execution of transactions is illustrated. As depicted memory 405 is adapted to hold program code 410, such as Operating System (OS) code, hypervisor code, application code, dynamic compiler code, etc. As an example, program code 410 includes at least a portion of application code that is to be dynamically (at runtime or partial program compilation) optimized according to FIGS. 2a-2b. During runtime code 410, which includes optimized code with transactions having code to support dynamic resizing, is executed. In one embodiment, program code 410 includes a conditional commit instruction 415, such as a region check instruction, as previously discussed.

Here, decoders 425 (decode logic of a processor) are adapted to recognize conditional commit instruction 415. For example, decode logic 425 is designed and interconnected to identify opcode 418 as part of an Instruction Set Architecture. As a result, specific (pre-defined) operations/micro-operations are to be performed by logic 430, hardware 435, and execution logic 440 in response to decoders 425 decoding conditional instruction 415 including operation code (op code) 418. As depicted, conditional instruction 415 includes a reference to expected hardware usage (hardware usage metric) 416 and branch address 420 (an address location such as a base address and offset within code to another, target address).

When decoders 425 decode/encounter conditional instruction 415, in one embodiment, hardware is to determine if there are sufficient hardware resources available to accommodate the executed hardware usage indicated by conditional commit instruction 415. Any known method and apparatus' may be utilized to determine hardware resource usage and whether enough resources are available to accommodate an expected usage of the hardware resources. Yet, a specific example is discussed below to provide an illustration of one embodiment for implementing such a determination.

Here, when decoders 425 receive conditional instruction 415, other operations/micro-operations are performed by decoders 425 and logic 430 within a processor pipeline. For example, decoders 425 may decode conditional commit instruction 415 into a plurality of operations (micro-operations), such as a trace of operations to be performed. Note from the discussion above that the trace may be stored/built in a trace cache after decoding. And for example, if one of the operations include a read of a register or a load from hardware 435 to indicate a usage level of a hardware resource, then logic 430 may allocate an entry in a load buffer and schedule execution of the load on execution logic 440.

Furthermore, hardware 435 is adapted to determine such a usage level 435, which is to be provided, determined, or loaded in response to conditional instruction 415. From above, numerous examples of hardware to support transactional execution that may have a usage level determined include a cache memory, a speculative cache memory, a store buffer, a load buffer, a register file, a speculative register file, a checkpoint register file, etc. As a result, instruction 415 may include one or more expected usage metrics for one or more hardware resources. And either separate hardware or the resources themselves are adapted to track their usage level. For example, cache control logic for a cache memory, in one embodiment, is adapted to track a usage level of the cache memory, such as a number of invalid cache lines held in the cache memory or a number of available lines in the cache memory.

Then, based on the expected usage level in comparison to the determined hardware usage level, it is determined whether sufficient resources exist to continue execution of a transaction without an early commit (dynamic resizing). And if an early commit is to be performed, then in the depicted example, execution logic 440 jumps to branch target address 420, as provided by the conditional commit instruction 415. As mentioned above, the branch target address may include code, when executed, to commit the transaction early and restart another transaction to continue atomic execution.

As a specific illustrative example, assume conditional commit instruction 415 is received by decodes 425. And conditional instruction 415 includes an expected usage metric 416 of ten store buffer entries and ten cache lines. Hardware 435 (a transactional cache memory and a store buffer) determine their usage level. Note that these hardware entities may be continuously tracking usage, and they provide such usage upon query/request by a conditional commit instruction 415. Or, the logic may actually determine the usage when the request from the conditional commit instruction 415 is received. Either way, hardware usage level/metric 436 is provided to a storage element, such as a register that holds information for operation by execution logic 440. Then, the hardware usage level 436 and the expected hardware metric 416 is compared to determine if sufficient resources are available to continue execution without an early commit. Note from above, the comparison may utilize a buffer zone, threshold, or direct comparison to determine if enough resources are available based on any algorithm preference of the designer.

Here, assume that the store buffer is utilizing 16 of 32 store buffer entries (16 available entries) and the transactional cache has 60 of 64 entries marked as transactionally accessed (the transaction has already accessed these lines and a replacement of such a line would result in loss of information causing an abort or extension into software transaction execution, i.e. 4 available entries). And assume that the designer algorithm designates that there should be 4 available entries after taking into account the expected number of entries. In that case, with 10 expected store buffer entries and 16 available entries, there is sufficient, available space in the store buffer to accommodate the atomic execution until the next conditional commit point. Yet, there are only four cache entries that are not marked as transactionally accessed, so there is not sufficient transactional cache space. As a result, execution logic 440, such as a jump execution unit, jumps to branch target address 420 to fetch, decode, and execute code to commit the transaction early (dynamically shrinking the transaction) and restart another transaction.

Note that the examples above have been discussed in reference to a conditional commit instruction including expected hardware usage metrics and branch target addresses. However, a conditional commit instruction may include any instruction causing hardware to evaluate or estimate whether there is enough hardware availability to support execution of code. For example, the conditional commit instruction may be only a conditional jump instruction, where the hardware evaluates current usage level against past hardware profiling of the code to determine if a transaction should be committed. And the hardware after making the evaluation, is able to jump to the branch address provided by the conditional commit instruction.

Note that in another embodiment, hardware may asynchronously (not tied or in response to a specific conditional commit instruction) determine that a transaction is to be committed. Here, when the processor is executing transactional code and an overflow event (an event indicating no space is left in a hardware resource, such as an eviction of an entry that is already transactionally marked) occurs, then the hardware may commit the hardware transaction and restart a new transaction without the code ever knowing any better.

Figure 5:
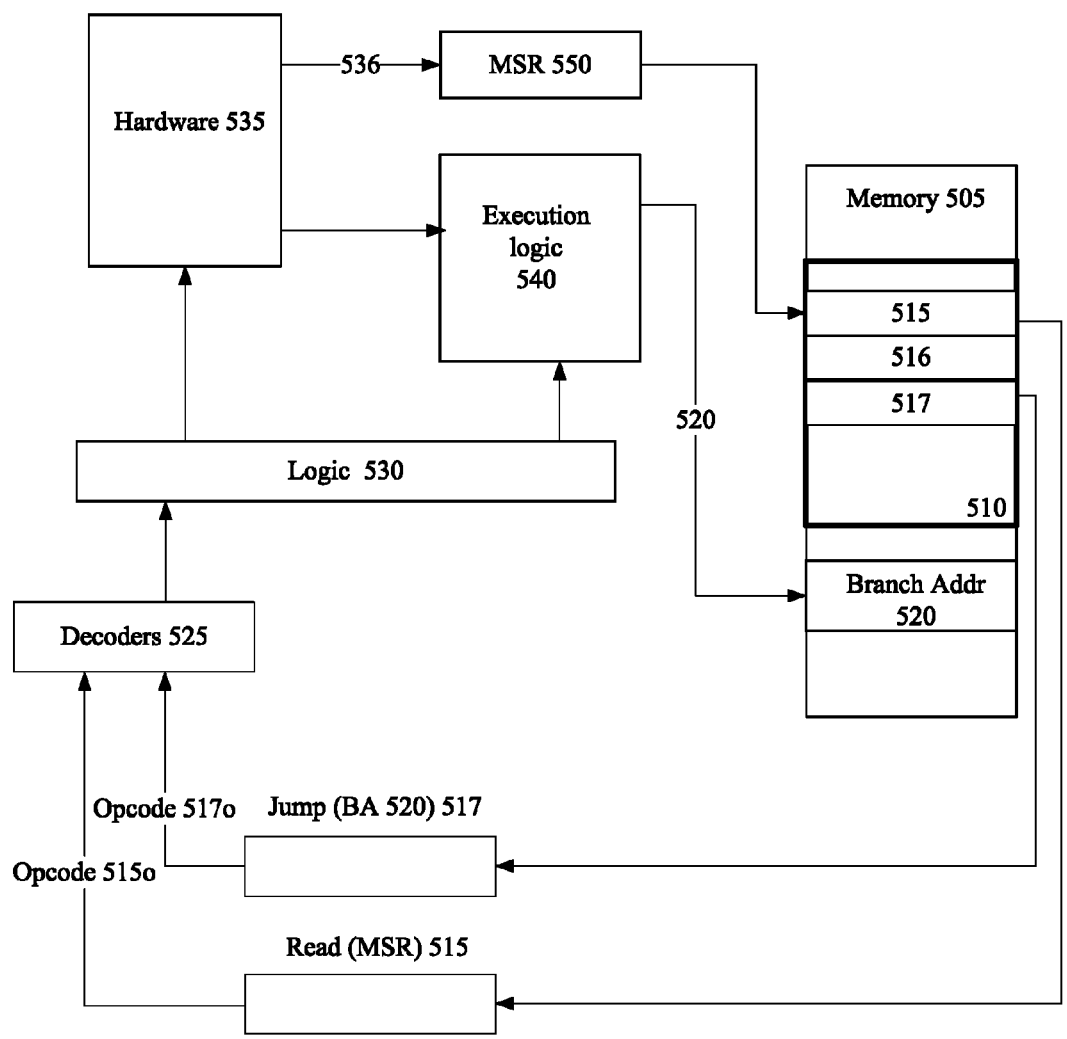
FIG. 5 illustrates another embodiment a logical representation of hardware adapted to support dynamic resizing of transactions.
Figure 6:
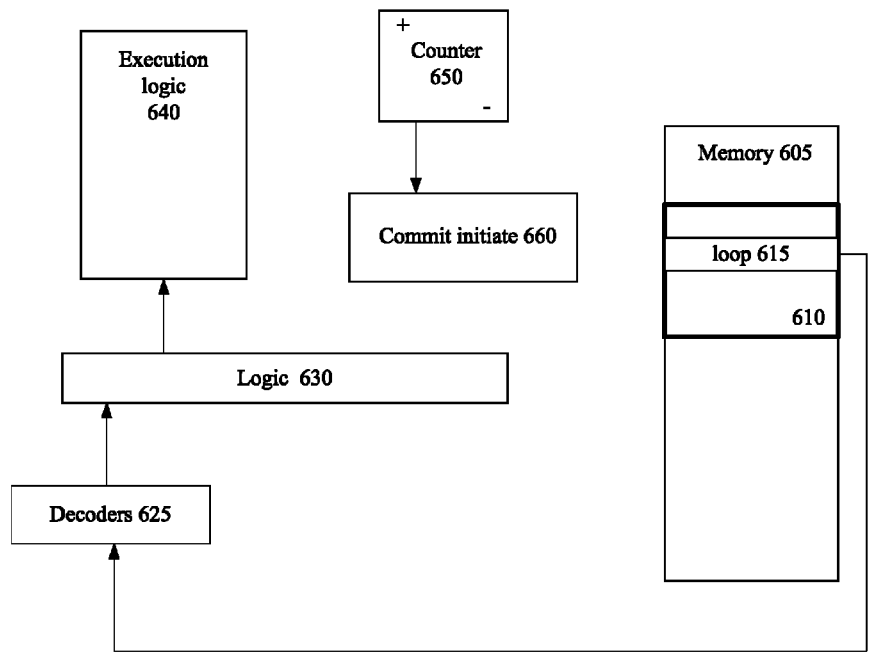
FIG. 6 illustrates another embodiment of a logical representation of hardware adapted to support dynamic resizing of transactions.

Referring next to FIG. 5, another embodiment of hardware to support dynamic resizing of transactions is illustrated. Previously (in regards to FIG. 4), it was discussed that a determined hardware usage level/metric may be placed in a storage element, such as a register that is to be utilized for operation by execution logic 440. Similar to that example, the determined hardware usage level/metric may be similarly loaded into a storage element, such as register 550. However, in one embodiment, register 550, which may include a Model Specific Register (MSR), is adapted to be accessible by (exposed to) program code, such as user-level application code, to perform an evaluation of hardware resource availability. In the previous example, hardware performed the evaluation based on expected usage from software. Yet here, software is able to query the hardware (MSR 550) and receive the usage level of one or more hardware resources. Then, the software is able to determine based on its own guidelines whether there is sufficient resources to continue atomic execution to the next commit point. This may provide more flexibility to the user, because it allows the user to determine how much of the hardware to use. As a result, a processor designer may select whether the processor should retain more control or whether the user is able to make such determinations.

As a specific illustrative example, assume that the processor is executing dynamic compiler code to optimize and execute program code 510 including an inserted/optimized transaction for potentially dynamic resizing. Here, fetch logic for the processor (not shown) based on an instruction pointer for a thread of the processor (also not shown) fetches a load operation 515. A load buffer entry is allocated in logic 530/hardware 535 in a load buffer. The load is scheduled and dispatched by logic 530, as well as executed by execution logic 540 to load the determined usage level 536 from hardware 535 (a resource to support transactional execution, such as a cache, buffer, or register file). Note that the load or preceding instruction may synchronously cause hardware 535 to determine the utilization and/or place the utilization in MSR 550. Alternatively, hardware 535 may place the utilization level in MSR 550 asynchronously (based on an event or in a periodic nature). Either way, the usage level is read and evaluated by operation 516.

For example, operation 516 may include a Boolean expression that evaluates the loaded, hardware usage level with an expected usage level or other threshold level defined by software. In fact, the Boolean expression may be part of a conditional statement and/or jump instruction 517, which is discussed in more detail immediately below. Here, if the evaluation of the hardware usage level indicates that the transaction should be committed early, then jump instruction 517 as recognized by decoders 525 through opcode 517*o* is executed to branch to destination address 520, as discussed above, to commit the transaction and restart another transaction.

Turning now to FIG. 6, yet another embodiment of hardware to support dynamic resizing of transactions is illustrated. In one embodiment, counter 650 is adapted to count a number of iterations through execution of loop 615. Note that counter 650 may be implemented in hardware, software, firmware, or a combination thereof. For example, counter 650 may be a register to hold a value. And software code reads a current value, modifies (increments/decrements) the current value to a new value, and stores the new value in the register upon each iteration through the loop. Essentially, software is maintaining the counter. However, a hardware counter may increment/decrement at the start or end of each iteration of the loop as well.

In one embodiment, the counter value of counter 650 is used to determine when an early commit of a transaction is to occur. For example, counter 650 counts the number of iterations of a loop until it reaches a threshold. Upon reaching the threshold, the counter expires or overflows causing an early commit. Note that the counter may start at zero and count up until reaching a threshold (overflowing) or start at a value and count down to zero (expiring or underflowing).

The threshold value (or start value for a counter decrementing to zero) may be determined in any manner. It may be a static, predefined value, which is included in hardware or set by software. Here, the static, predefined value may be intelligently selected by hardware or software based on any known characteristic, such as the type or size of hardware included in a processor, as well as the type or size of code being executed. Or the static, predefined value is selected lazily, such as a conservative value to limit the number of iterations of a loop to a small enough number that roll-backs are considerably reduced.

As an alternative embodiment, the threshold (start value) is both dynamically selected and alterable. Here, hardware, software, or a combination thereof may select an initial start value (threshold) based on any characteristic(s). For example, a number of available cache lines or store buffer entries (e.g. 32) is divided by a count of the number of stores in a single loop iteration of the code (e.g. 8) to determine the threshold (e.g. 4). The estimation of a number of stores, in one embodiment, is reasonably conservative, since multiple stores may only touch a single cache line. So, a more aggressive initial value may also be used. As another example, either code or hardware selects an aggressive or conservative value based on code size/type, hardware unit size/type, or other known factor for ensuring execution of a loop has enough resources to complete. Furthermore, hardware or software may profile the code and provide a start/threshold value. Here, a software hint including the threshold number is provided before execution of the loop commences, and the counter is set based on that threshold number. Or hardware may similarly profile code and set the counter based on the profile history of a region of code.

In one embodiment, after initializing the counter, the threshold (start value) is dynamically modified, such as adjusted based on execution analysis (code profiling or roll-back determination) of the loop. Essentially in one embodiment, counter 650 is being used to estimate a number of times iterations of loop 615 is able to execute before a roll-back or an acceptable number of roll-backs occur due to limited hardware resources. Therefore, if more than an acceptable number of roll-backs happen, then the previous threshold is decreased to reduce the number of roll-backs by reducing the number of iterations before a commit occurs. In this scenario, too frequent roll-backs wastes execution time and potentially causes delays. However, to ensure the threshold is not too conservative (extraneously committing transactions early when there are still plenty of resources available, which results in inefficient atomic execution), the threshold, in one embodiment, is increased until a roll-back does occur. Note that the increment/decrement may occur in single, multiple, or exponential increments. As an example, assume a start value is initially set to 63 (i.e. 64 iterations allowed before a commit). If a number of abort/roll-back due to hardware constraints is detected, the threshold is decremented to 62. Upon subsequent roll-backs, it's further decremented by 2 (60), 4 (56), 8 (48), etc., until a balanced start value is determined that allows execution to complete efficiently.

Note that the discussion of FIG. 6 has been in reference to a counter to count a number of loop iterations without specific reference to conditional commit instructions. Here, the counter reaching a threshold may initiate a commit through hardware asynchronously. However, in another embodiment, counter 650 works in conjunction with conditional commit code from FIGS. 5 and 6. As an example, the counter may be the hardware mechanism which determines/estimates an amount of hardware resources available and the conditional commit instruction causes the jump to the commit code based on the hardware counter. For example, assume counter 650 is initialized to nine (ten iterations allowed before a conditional commit should occur). And upon every iteration of loop 615, a conditional commit instruction, such as a conditional jump instruction, is executed to jump to a branch target address if the counter has expired (reached zero). When the tenth iteration is completed and the conditional jump is executed, the execution flow jumps to the target address for commitment of the executing atomic region.

Although the counter is not an exact, specific usage level measurement of individual hardware units, it potentially is a more all encompassing estimation. As discussed above, through dynamic adjustment of the threshold, an optimal number of iterations for reducing roll-backs based on hardware limitations may be found. Therefore, if any previously unidentified hardware limitation is causing roll-backs the dynamic counter threshold is able to catch it, while individual identification by a designer or programmer may leave out such an unidentified cause. Furthermore, the counter may also be utilized along with specific hardware unit utilization measurement to provide both unit level granularity, as well as the overreaching, global granularity.

The previous discussion has primarily focused on conditionally committing transactions before hardware resources are exhausted. Or determining hardware utilization against expected utilization to determine if enough resources are available to support execution. However, in some embodiments it may be advantageous to execute through an atomic region. And periodically (either in response to a user instruction, event, or hardware defined time) to checkpoint the atomic region. So, upon encountering an actual hardware limitation, exception, interrupt, or other fault; the atomic region is capable of being rolled-back to a recent, interim checkpoint and committed to free resources. Essentially, instead of making a forward-looking estimation and proactively committing the transaction, in one embodiment a transaction is only re-sized upon encountering an actual resource limitation that would normally require an abort and restart of the entire transaction. This is accomplished by performing multiple checkpoints within the transaction to ensure if a roll-back occurs, it's only an acceptable amount of execution that is rolled-back.

Figure 7A:
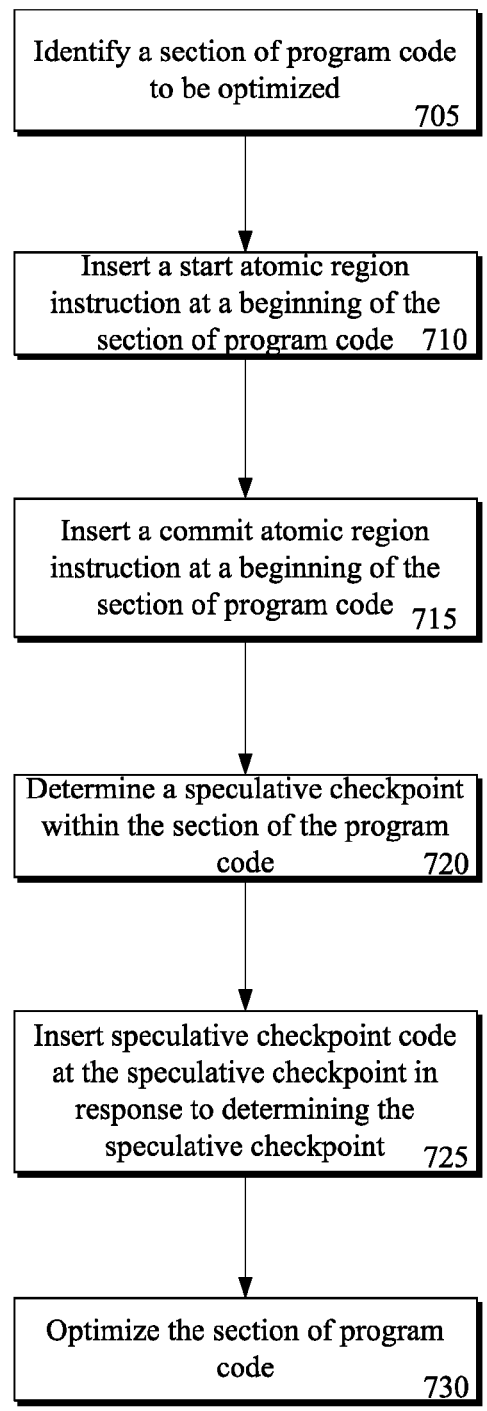
FIG. 7a illustrates an embodiment of a flow diagram for a method of optimizing code including providing for speculative checkpoints within a transaction.
Figure 12G:
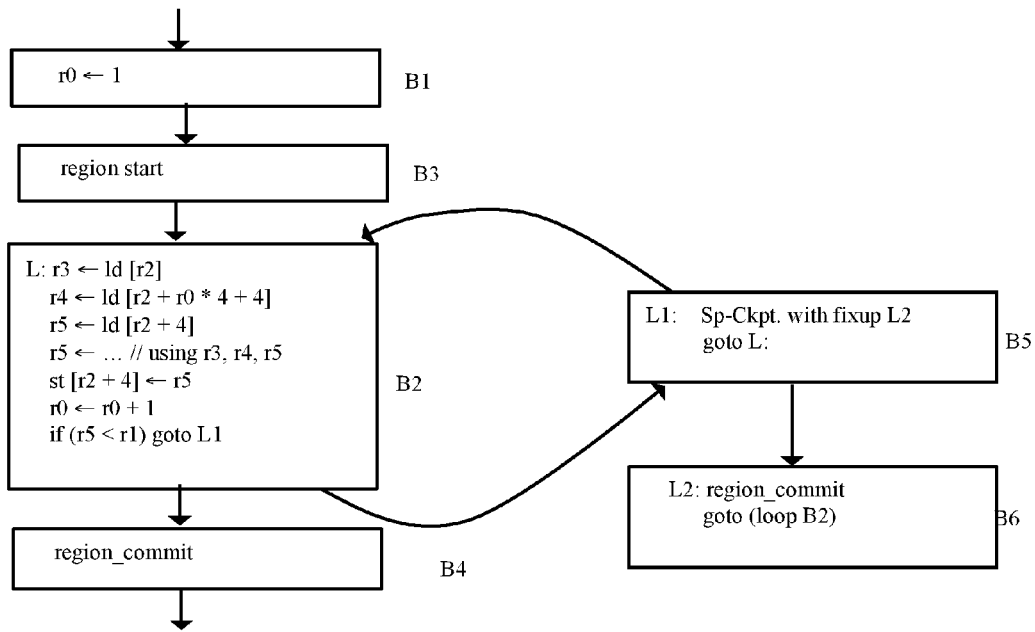
Figure 12H:
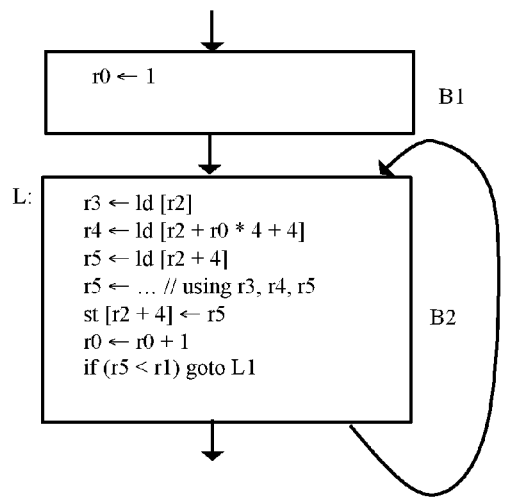
Figure 12I:
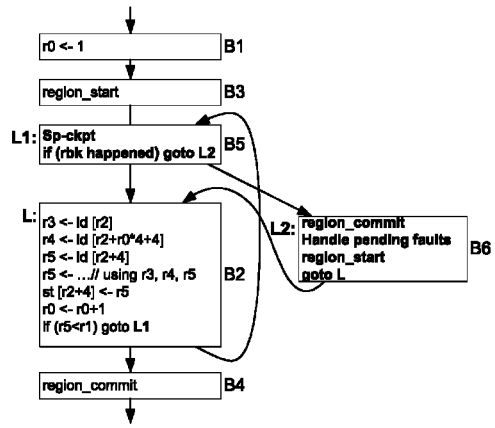
Figure 12J:
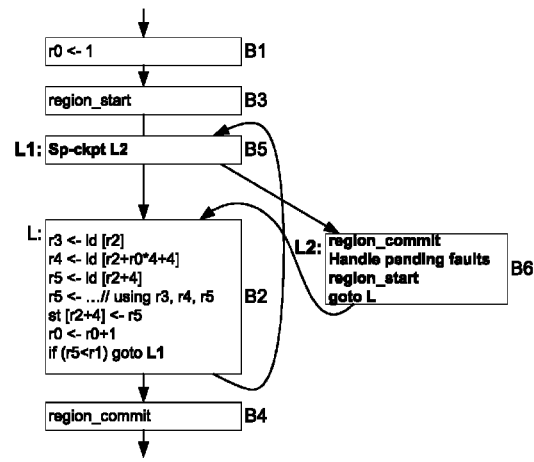
Figure 12K:
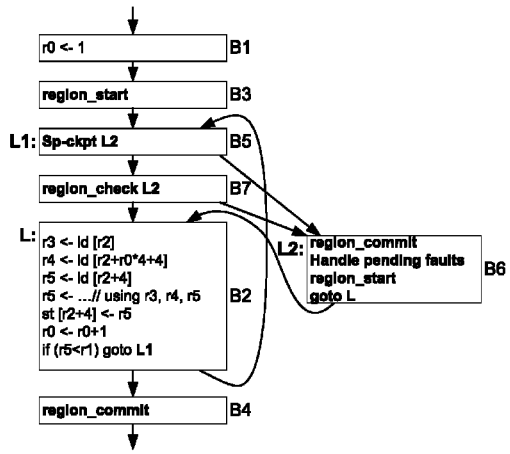

Turning to FIG. 7a, an embodiment of a flow diagram for a method of optimizing code including providing for speculative checkpoints within a transaction is depicted. In block 705, a section of program code to be optimized is identified. Similar to the discussion of FIG. 2a, a section/region of code may be identified based on a user identification/hint regarding the section, program analysis, code profiling, code attributes (specific type, format, order, or characteristic—a loop or number of stores—of the region), or other known method for identifying a code region that is to be optimized. In one example the code includes binary code. And during execution of the binary code, it is to be dynamically optimized. As a result, during optimization for execution, a loop is encountered in the binary code. So, the loop is determined to be optimized (speculative checkpoints inserted) to ensure the distance between checkpoints is small enough that a roll-back doesn't result in a large loss of execution. As an example, Pseudo Code F (see FIG. 12O illustrates an example of a code region to be optimized.

Also similar to the discussion of FIG. 2a, in flows 710, 715 the region of code is demarcated (insert start atomic region instruction at beginning of the section and an end atomic region instruction at the end of the section). And as aforementioned, the code region may include multiple entries and multiple exits. In block 720, a speculative checkpoint location within the program code is determined. Note that multiple speculative checkpoints may be determined/assigned within a region of code to be optimized, but for the ease of discussion only one checkpoint is discussed in more detail below.

Determining a speculative checkpoint may be based on any known assignment/determination algorithm for minimizing roll-back effects within an atomic region. As a first example, a speculative checkpoint is inserted within a loop, such that a speculative checkpoint is encountered upon every iteration. Here, a speculative checkpoint may be determined to be the beginning of the loop or at an edge of the loop. As another example, dynamic profiling of the code indicates execution paths that often result in running out of hardware resources or that have high instruction counts. So, speculative checkpoints are assigned to such execution paths to avoid rolling back the entire atomic region due to an abort within the long execution path. Similarly, execution paths that are known to monopolize or be resource heavy may have speculative checkpoints assigned to them. Essentially, instead of the prior art checkpoint before an entire transaction and an associated roll-back of an entire transaction, smaller roll-backs (less wasted execution) are performed by utilizing checkpoints within a transaction (local, internal, or temporary checkpoints). As a result, larger regions may be optimized. And if a resource limitation is encountered, a small roll-back is performed. In addition, at the roll-back point, the transaction is potentially committed, eventual faults are handled, and another transaction restarted.

Figure 7B:
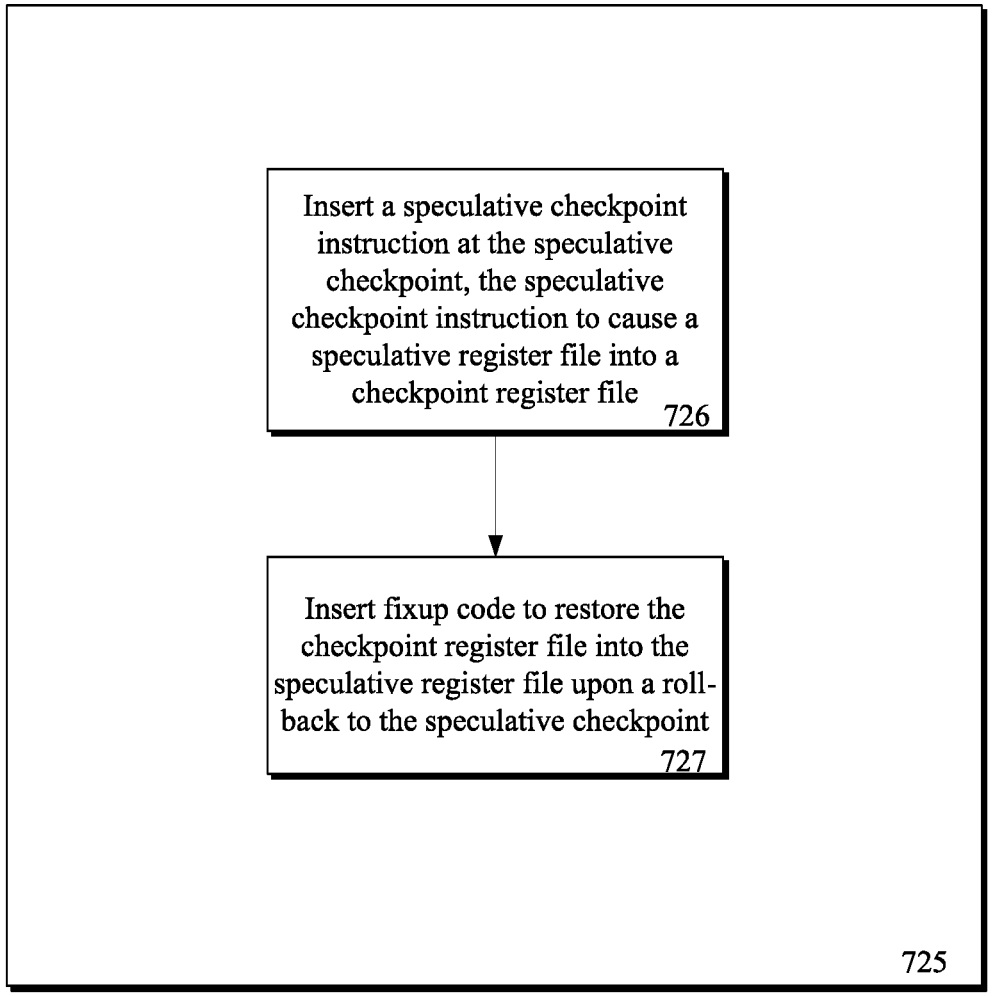
FIG. 7b illustrates an embodiment of FIG. 7a's flow diagram for inserting speculative checkpoint code.

In flow 725, speculative checkpoint code is inserted at the speculative checkpoint location. The speculative checkpoint code is to checkpoint speculative hardware resources, such as a memory, cache memory, and/or register file. And in one embodiment, the speculative checkpoint code may also include code to restore the hardware resources to the checkpoint in response to a subsequent abort condition. Turning briefly to FIG. 7b, an embodiment of a flow diagram for inserting speculative checkpoint code is illustrated. Pseudo Code G (see FIG. 12g) also depicts an illustrative example of code after insertion of speculative checkpoint code.

In flow 726, a speculative checkpoint instruction/operation (L1 in B5) is inserted at the speculative checkpoint (loop back edge of B2, B5). In one embodiment, the speculative checkpoint instruction includes any instruction to initiate a checkpoint (current snapshot) of speculative hardware resources. For example, the speculative checkpoint instruction is recognizable by decoders of a processor. And once decoded, scheduled, and executed, causes a speculative register file, a store buffer, or both to be checkpointed (a snapshot of the current state) into checkpoint storage structures, such as a checkpoint speculative register file and a speculative cache.

Furthermore, in one embodiment, speculative checkpoint code also includes some other code to perform some action to potentially avoid the same roll-back situation that caused the current roll-back. For example, if a roll-back occurs due to limited hardware resources, if an alleviation action is not taken the same hardware limitation may be encountered each time, resulting in no forward progress.

As an example, assume the code on the left in Pseudo Code H (see FIG. 12h) is to be optimized.

Here, multiple scenarios exist for how to handle a roll-back within the optimized code. As a first example, as illustrated by Pseudo Code I (see FIG. 12i) below, a speculative checkpoint instruction is paired with a conditional (branch) instruction that is able to differentiate between normal loop execution or a re-execution after a rollback to a speculative checkpoint. The branch instruction, when executed, jumps to a different execution path to handle the roll-back in any known manner for rolling back to a previously checkpointed state.

In another scenario, shown in Pseudo Code J (see FIG. 12j), the speculative checkpoint instruction is combined with a branch instruction into a single checkpoint and branch instruction, which has been discussed above in some embodiments.

Returning to discussion of Pseudo Code G, in one embodiment, speculative checkpoint code also includes fix-up (may also be referred to as roll-back, restore, reconstruct, recovery, etc.) code (B5), when executed, to restore or recover the precise state of the latest checkpoint from the checkpoint storage structures. Note that the other scenarios described above, in some embodiments, may also be considered speculative checkpoint code and/or fix-up code. Yet here, as shown in Pseudo Code G, fix-up code may also include commit code (B6) to commit the transaction/atomic region. Essentially, the speculative checkpoint code, checkpoints the speculative hardware. And upon running out of speculative hardware or encountering an event (interrupt, dynamic assertion, memory alias check, etc) that causes an abort, the checkpoint code recovers the precise state in the speculative hardware. Additionally, to free up the speculative hardware for re-execution and continued execution, the transaction is optionally committed. From this discussion, it can be seen that reaching the fix-up code may be done in multiple ways. As examples, the fix-up code may be entered from: (1) execution of a speculative checkpoint operation where the checkpoint storage structures do not have enough space to checkpoint speculative hardware; (2) execution of speculative operations that the speculative hardware is not able to accommodate; (3) an exception during speculative execution; or (4) any other event resulting in a roll-back to a temporary, internal checkpoint within a transaction.

Moreover, a speculative checkpoint may be combined with a conditional commit to provide further benefits, such as avoiding aborts due to lack of speculative resources, while checkpointing make any such roll-backs/aborts due to fault, exception, or other unpredictable cause much cheaper (less execution wasted in returning to a checkpoint instead of the start of the entire atomic region). Pseudo Code K (see FIG. 12k) depicts one example of such a combination.

Figure 12L:
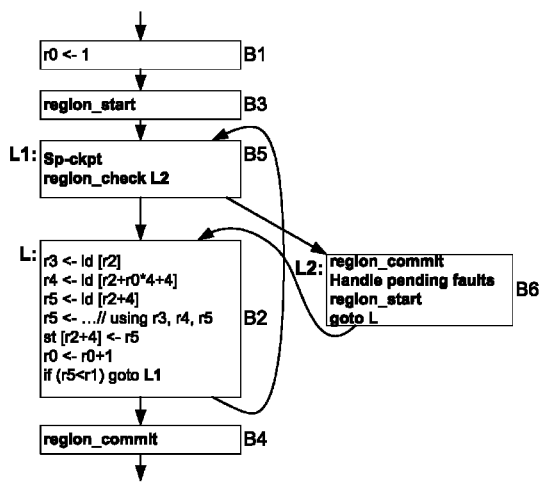

Furthermore, in one embodiment, the conditional commit instruction is made aware of the speculative checkpoint, as shown in Pseudo Code L (see FIG. 12l).

In this case, the region_check (conditional commit) instruction jumps to L2 if the system is about to run out of resources (as described above) or execution is a roll-back replay (after the execution rolls back to the speculative checkpoint).

Figure 12M:
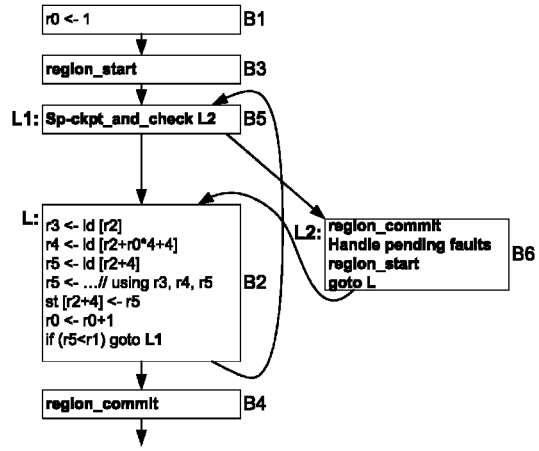

In addition, not only may the speculative checkpoint and conditional commit instructions be used together, the instructions themselves, in one embodiment, are combined as depicted in Pseudo Code M (see FIG. 12m).

Here, when the combined instruction is executed, the checkpoint is performed and the conditional commit is evaluated (commit if hardware is about to run out or run low on resources). Here, if the system is running low on speculative resources or if the execution rolls back to a recorded speculative checkpoint, the execution jumps to L2 and handles (in this example) it by committing the speculative resources and servicing eventual faults.

Although the previous discussion has been in reference to a roll-back to a previous (or recent speculative) checkpoint once hardware is running low, a fault is detected, an exception occurs, or other unpredictable event causes an interruption, other paths may be explored in response to such interruptions. In fact, in one embodiment, upon an interruption, hardware, software, or combination thereof makes a decision on what to do next. For example, assume a fault, such as a hardware generated fault/event, occurs during atomic execution. The atomic execution is interrupted. And normally control is handed over to software to determine the type of fault and to service the fault.

Here, the software, such as a handler may decide on what to do next based on any number of factors, such as the type of fault, the difficulty in rolling-back to a most-recent speculative checkpoint, the number of instructions or amount of execution lost by rolling back to a last commit point instead of the most recent speculative checkpoint, or other known factor in choosing a point of execution in a program for a return. Essentially, in this illustrative example, software, such as a handler is making the determination if execution should be rolled-back to the start of an atomic region, the last commit point within the atomic region, or a latest speculative checkpoint within the atomic region. And even though the examples have focused on software making the decision, hardware may also make such a decision. In one embodiment, a new instruction (speculative_rollback) is utilized in making the determination. Here, the speculative_rollback instruction includes any information that once decoded and executed results in a return to the appropriate (speculative checkpoint or recent commit point) in the program code.

It's important to note that the code described herein doesn't have to be collocated within the same block, region, program, or memory space. In fact, a speculative checkpoint operation may be inserted at the loop-back edge within main program code. And the fix-up code, including the code to roll-back to the nearest checkpoint and optionally commit the transaction, may be located in a library or other portion of the code. Here, the main program code is executing. And when the fix-up code is to be entered, a call to one or more functions of the library code is executed to perform the roll-back and commit. Also, hardware may perform similar checkpoint operations without the direction of software. Here, hardware transparently checkpoints speculative hardware, such as on a periodic or event driven basis. And in response to running out of speculative hardware, the processor rolls-back execution to the latest checkpoint, commits the transaction, restarts the transaction, and replays the instructions between the checkpoint and the roll-back point. From the perspective of the software, execution has continued normally, while the hardware has handled all of the resource constraints and re-execution. Yet, any level of cooperation between hardware and software may also be used to achieve the local, internal transactional checkpoints.

Figure 12N:
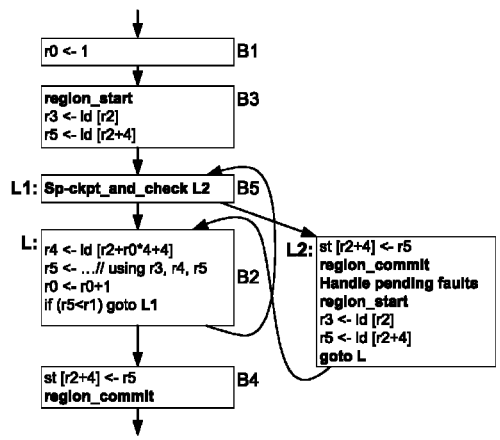
Figure 12O:
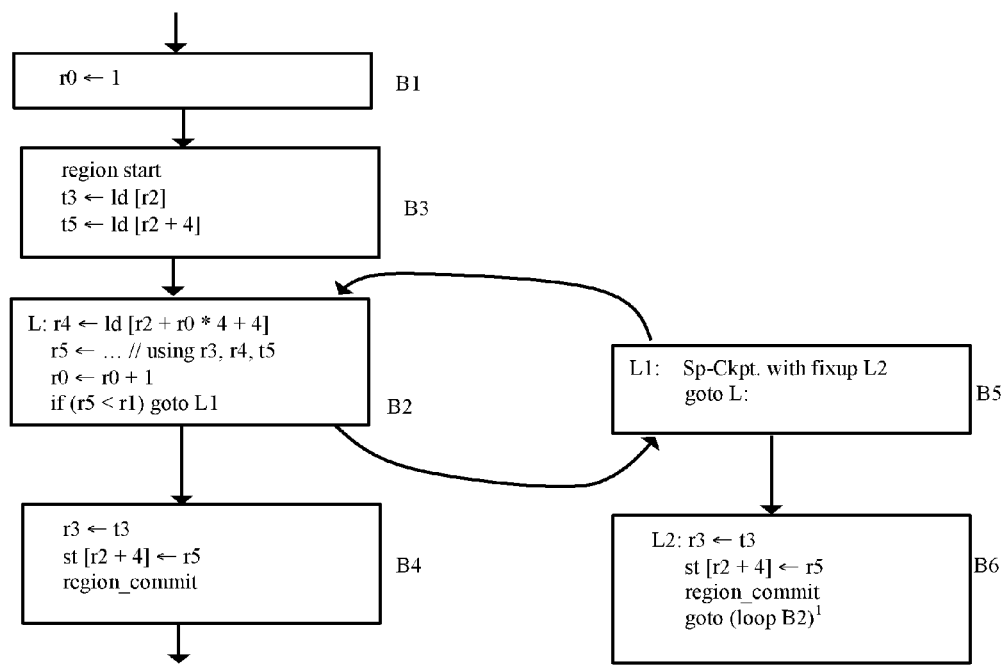

Returning to FIG. 7a, in block 730 the section of program code is optimized. Pseudo Code N depicts an example of the code region from Pseudo Code M (see FIG. 12n) after optimization.

As another example of optimization, Pseudo Code O (see FIG. 12o), illustrates another example of optimization (optimization of the code region from Pseudo Code G).

As discussed above, any known optimization technique may be performed on the code within the atomic region. A few examples of code optimization, which are a non-exhaustive list and purely illustrative, include: PRLE, PDSE, loop optimization, data-flow optimization, code generation optimization, bounds checking elimination, branch offset optimization, dead code elimination, and jump threading. In Pseudo Code O, after committing in B6, another transaction is started at B6 and the execution continues at B2. In other embodiments (not illustrated) code may be re-entered at B3. Note that demarcation of an atomic region and insertion of conditional commit code may also be considered optimizing program code in some embodiments.

Referring next to FIG. 8, an embodiment of a flow diagram for a method of speculatively checkpointing memory during execution of a transaction is illustrated. In flow 805, a transaction is executed. As one example, the transaction is in binary code that is dynamically optimized during runtime to insert the transaction around code optimizations ensuring atomicity.

In flow 810, a speculative checkpoint instruction from the transaction is encountered. The speculative checkpoint instruction may also have been inserted during runtime by an optimizer at a speculative checkpoint, as discussed above in reference to FIGS. 7*a*-7*b*. A processor recognizes the speculative checkpoint instruction (typically by decoder that detect a pre-specified/defined operation code). And in response to the speculative checkpoint instruction, a speculative register file is checkpointed in a checkpoint (speculative) register file in flow 815. Additionally, it is determined if a speculative cache includes enough space to checkpoint a store buffer in flow 820. If enough space is available, then the store buffer is checkpointed in the speculative cache in flow 825. However, if there is not enough space, then the fix-up/roll-back procedure (blocks 845-855 discussed in more detail below) are performed.

As a result, if a short-term roll-back event is encountered during execution of the transaction, the speculative register file and the store buffer being utilized for current execution is able to be restored to the checkpointed state. As an example, in flow 830 a store operation is encountered. In flow 835, it is determined if the store buffer includes an available entry, such as an entry that is available to be allocated for the store operation. And if there is an entry that is readily available, or there is an entry that may be deallocated and reallocated, then the entry is so allocated in block 840. However, if there is no store buffer entry available, then the roll-back procedure (blocks 845-855) is performed.

The roll-back/recovery procedure 845-855 is to restore the precise architecture state from a previous checkpoint. Here, the roll-back is during speculative execution that has not committed (has not been made globally visible). Therefore, the globally visible state (non-speculative storage structures) should remain the same. However, the speculative hardware structures supporting the current speculative execution are restored. Since the speculative cache already holds the speculative updates from the store buffer up to the most recent checkpoint, then the store buffer is flushed in block 850. In other words, the stores from the start of the transaction to the most recent checkpoint are held in the speculative cache. And the stores from the most recent checkpoint to the current execution point (initiation of a roll-back) are held in the store buffer. So, those stores that are being rolled-back are simply discarded from the store buffer.

In addition, the speculative register file is restored from the checkpoint register file. Here, the speculative register file holds all of the updates from the beginning of the transaction including those from the most recent checkpoint, so the speculative register file is reloaded with the values from the checkpoint register file. Note that if the original checkpoint includes a copy of the entire speculative register file (not just selective storing of only registers modified during speculative execution), then the checkpoint register file may be re-labeled (utilized) as the speculative register file and the previous speculative register file may be flushed and subsequently utilized as the checkpoint register file. Or the speculative register file is flashed copied (in one or a few cycles) to speculative checkpoint register file.

In flow 860, the transaction may be optionally committed. Since the roll-back procedure is reached in response to an exception, lack of space in the speculative cache, or lack of space in store buffer, then the transaction may be committed to free those resources. Here, the store buffer and speculative cache updates are committed to a non-speculative cache memory, freeing those resources (shown in flows 875-880). And similarly the speculative register file is committed to a non-speculative register file, freeing it for further speculative execution (shown in flows 875-880). Moreover, if a full abort of the transaction is to be performed (865), then the store buffer and the speculative cache are flushed to restore them to the pre-transaction (non-speculative) state in block 870.

Figure 9:
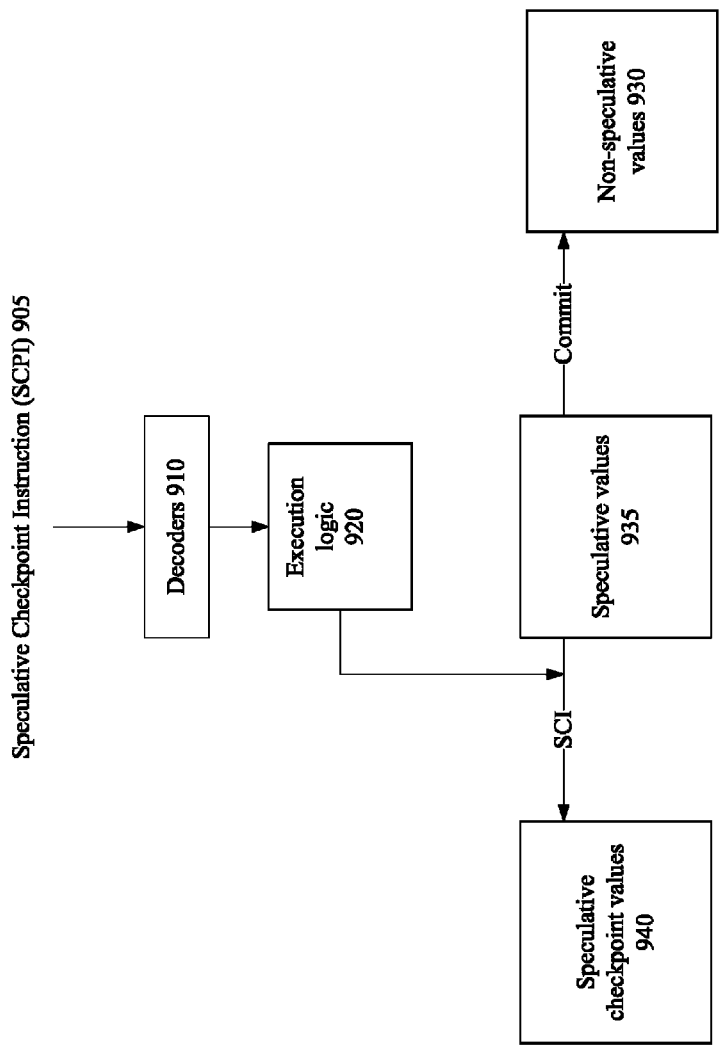
FIG. 9 illustrates an embodiment of a logical representation of hardware adapted to support speculative checkpointing of memory.

Turning to FIG. 9, an embodiment of a logical representation of hardware adapted to support speculative checkpointing is depicted. Decoders (decode logic) 910 are adapted or interconnected to recognize speculative checkpoint instruction (SCPI) 905. For example, a predefined format of an instruction for a processor including the hardware of FIG. 9 may be specified and designed into hardware. And a portion of the instruction with specific bit patterns correspond to specific instructions; one of which is the SCPI 905.

Then, in response to the SCPI, speculative values 935 held in a speculative storage structure are checkpointed as speculative checkpoint values 940 in a speculative checkpoint storage structure. Note that the execution logic 920 is illustrated as coupled to decoders to execute SCPI 920. Yet obviously, there are often numerous stages of a pipeline between decoding and execution. For example, the SCPI may be decoded into a trace of operation within a trace cache; and those operations may be queued in buffers, scheduled, dispatched, and executed to perform the operations/methods described herein.

As briefly mentioned above, a checkpoint includes a snapshot of a state of values at a point in time, or at least enough information to recover that state of values at the point in time. Therefore, the checkpoint, in one embodiment, includes an entire copy of the speculative values 935 as speculative checkpoint values 940. Here, the speculative values 935 may include speculative register file values from a speculative register file, and the speculative checkpoint values 940 include a copy of the speculative register file at a most recent checkpoint in time. As another example, the speculative checkpoint values include only the speculative values 935 that have been modified since the last checkpoint. Here, the speculative values 935 may include speculative register file values from a speculative register file, and the speculative checkpoint values 940 include speculative register file values from the last checkpoint from only registers in speculative register file that have been modified since the last checkpoint. As yet another example, the speculative checkpoint values 940 include all of the values from a beginning of an atomic region up to a checkpoint in time, while the speculative values 935 include all of the speculative values from the checkpoint to the current execution point. Here, a store buffer may hold the speculative values 935, which are added to older values (from the start to the last checkpoint) held in a speculative cache.

Figure 10:
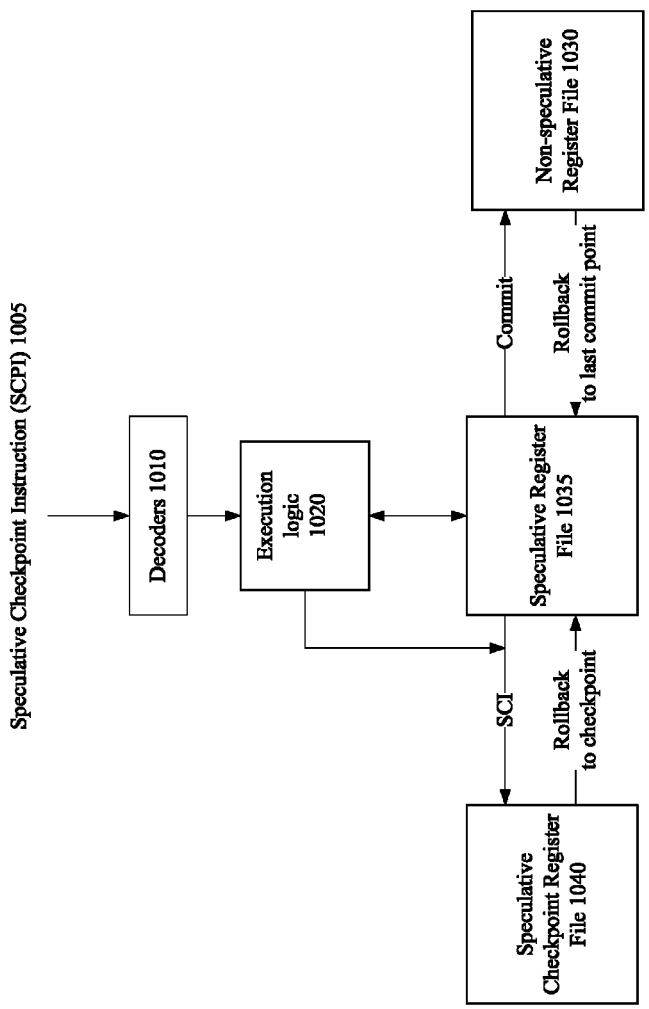
FIG. 10 illustrates another embodiment of a logical representation of hardware adapted to support speculative checkpointing of a register file.

Referring to FIG. 10, another embodiment of a logical representation of hardware adapted to support speculative checkpointing of a register file is depicted. Similar to the discussion above, decoders 1010 and execution logic 1020 are adapted to receive, recognize, and execute SCPI 1005, respectively. In response to SCPI 1005, the speculative register file 1035 is checkpointed into speculative checkpoint register file 1040. As stated above, the checkpoint may include a flash copy of the register file 1035 into checkpoint register file 1040. Or when a register in file 1035 is to be modified, the old value is checkpointed into register file 1040. Here, instead of copying values in response to SCPI 1005, the old checkpoint values from file 1040 that were copied upon modification of their counterpart in file 1035 are cleared or marked invalid. When execution continues, the modified registers are again checkpointed in file 1040.

In response to a roll-back (from lack of space in a speculative cache as in block 820 of FIG. 8, lack of space in a store buffer as in block 840 of FIG. 8, an exception, or other roll-back event) to the most recent checkpoint, the checkpointed values (whether only the modified or a full copy) are restored from speculative checkpoint register file 1040 into speculative register file 1035. However, if there is a roll-back to the very beginning of a transactional region, such as an abort of the transaction, then the speculative register file 1035, in one embodiment, is re-loaded from the non-speculative register file 1030. Essentially, speculative file 1035 is the working, speculative register file. So the transaction is working (reading and writing) with the speculative register file 1035. So if a load at the beginning of the transaction is re-executed, if the non-speculative values are not reloaded, the load may inadvertently load a later modified, speculative value that was held in speculative register file 1035 before the abort.

Additionally, in response to a commit of the transaction, the speculative register file 1035 is committed (copied) to non-speculative register file 1030. Here, the speculative updates are being made globally visible as non-speculative results. Again, the entire register file 1035 may be copied to non-speculative register file 1030. Or only those registers in speculative register file 1035 that have been modified may be copied to non-speculative register file 1030.

Figure 11:
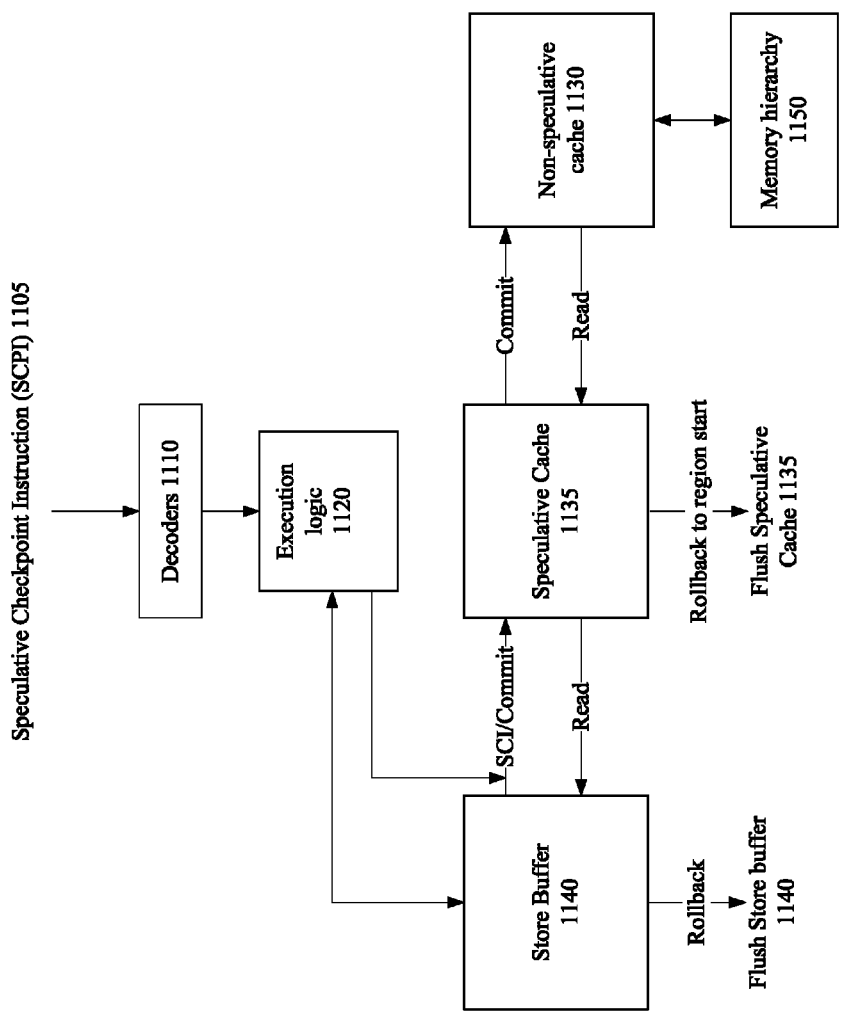
FIG. 11 illustrates another embodiment of a logical representation of hardware adapted to support speculative checkpointing of a cache memory.

Turning to FIG. 11, another embodiment of a logical representation of hardware adapted to support speculative checkpointing of a cache memory is illustrated. As above in regards to FIGS. 9-10, decoders 1110 and execution logic 1120 are adapted to decode and execute SCPI 1105. Here, execution logic 1120, when executing speculative stores from the atomic region, uses the store buffer 1140 to hold the speculative updates. Note that loads from that same region (the local thread) that load from previous stores are loading from the speculative values held in store buffer 1140. Therefore, a similar load of in-flight store mechanism may be utilized between store buffer 1140 and load execution units of execution logic 1120. However, non-speculative or non-local loads to an address of a store in store buffer 1140 are to receive the non-speculative value held in cache 1130, not the value in store buffer 1140. In addition, if there is a read/load from the atomic region to an address of a store that has been checkpointed or moved to speculative cache 1135, then the speculative cache value either directly or through store buffer 1140 should be provided to the load.

In response to SCPI 1105, the store buffer updates in buffer 1140 are moved to speculative cache 1135. As a result, speculative cache 1135 holds the speculative updates from the beginning of an atomic region to the most current checkpoint. And store buffer 1140 holds the speculative updates from that most current checkpoint to the current execution checkpoint. Therefore, upon a commit of the atomic region, all of the updates in the speculative cache 1135 and store buffer 1140 are committed/moved/copied to non-speculative cache 1130. As illustrated, this commit is performed by committing the store buffer 1140 to speculative cache 1135 and speculative cache 1135 to non-speculative cache 1130. But the updates from both the store buffer 1140 and speculative cache 1135, in another embodiment, are directly provided to non-speculative cache 1130. After committing, the updates are globally visible and may be propagated through memory hierarchy 1150 (higher level memories and to the home locations).

Furthermore, in response to a local, internal roll-back to the most recent checkpoint, store buffer 1140 is flushed. As described above, in this embodiment, store buffer 1140 essentially holds the updates from the most recent checkpoint to the current execution point. So upon a roll-back, those updates are discarded. Note that in one example, a local roll-back may be initiated in response to the store buffer 1140 not being able to accommodate a new store operation from the atomic region (block 840 of FIG. 8). And in block 820, a roll-back may also be initiated in response to the speculative cache 1135 being full and unable to cache store buffer 1140 updates upon SCPI 1105. Yet, when an abort (roll-back of the entire atomic region) occurs, then both store buffer 1140 and speculative cache 1135 (the updates from the beginning of the atomic region to the current execution point) are flushed.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A computing device to optimize program code, the computing device comprising:
   a compiler hardware module to: (i) identify a section of program code to be optimized, (ii) demarcate at least a portion of the section of program code as an atomic region in response to identification of the section of program code to be optimized, (iii) insert conditional commit code at a conditional commit point determined to be within the atomic region, and (iv) optimize the section of program code in response to identification of the section of program code to be optimized; and
   a decode hardware module to decode the conditional commit code within the atomic region.

2. The computing device of claim 1, wherein to demarcate at least a portion of the section of program code as an atomic region comprises to: (i) insert a start transaction instruction at a beginning of the portion of the section of code, and (ii) insert an end transaction instruction at an end of the portion of the section of code.

3. The computing device of claim 1, wherein to insert the conditional commit code at the conditional commit point determined to be within the atomic region comprises to insert a conditional commit code to:
   determine a representation of an availability of hardware resources adapted to support transactional execution; and
   commit the atomic region before an end of the atomic region in response to the representation of the availability of the hardware resources indicating insufficient resources to complete execution of the atomic region.

4. The computing device of claim 3, wherein the conditional commit code is to jump to a branch target address in response to the representation of the availability of the hardware resources indicating insufficient resources to complete execution of the atomic region.

5. The computing device of claim 4, wherein the conditional commit code comprises a conditional commit instruction, and wherein the conditional commit instruction comprises the branch target address.

6. The computing device of claim 4, wherein the compiler hardware module is further to insert a commit instruction at the branch target address, wherein the commit instruction is to commit the atomic region.

7. The computing device of claim 1, wherein to optimize the section of program code comprises to optimize the section of code via an optimization technique selected from a group consisting of Partial Redundancy Load Elimination (PRLE), Partial Dead Store Elimination (PDSE), loop optimization, data-flow optimization, code generation optimization, bounds checking elimination, branch offset optimization, dead code elimination, and jump threading.

8. A non-transitory, machine readable medium comprising a plurality of instructions stored thereon that in response to being executed by a computing device, cause the computing device to:
   identify a section of program code to be optimized;
   demarcate at least a portion of the section of program code as an atomic region in response to identification of the section of program code to be optimized;
   insert conditional commit code at a conditional commit point determined to be within the atomic region; and
   optimize the section of program code in response to identification of the section of program code to be optimized.

9. The non-transitory, machine readable medium of claim 8, wherein to demarcate at least a portion of the section of program code as an atomic region comprises to: (i) insert a start transaction instruction at a beginning of the portion of the section of code, and (ii) insert an end transaction instruction at an end of the portion of the section of code.

10. The non-transitory, machine readable medium of claim 8, wherein to insert the conditional commit code at the conditional commit point determined to be within the atomic region comprises to insert a conditional commit code to:
    determine a representation of an availability of hardware resources adapted to support transactional execution; and
    commit the atomic region before an end of the atomic region in response to the representation of the availability of the hardware resources indicating insufficient resources to complete execution of the atomic region.

11. The non-transitory, machine readable medium of claim 10, wherein the conditional commit code is to jump to a branch target address in response to the representation of the availability of the hardware resources indicating insufficient resources to complete execution of the atomic region.

12. The non-transitory, machine readable medium of claim 11, wherein the conditional commit code comprises a conditional commit instruction, and wherein the conditional commit instruction comprises the branch target address.

13. The non-transitory, machine readable medium of claim 11, further comprising a plurality of instructions stored thereon that in response to being executed by the computing device, cause the computing device to insert a commit instruction at the branch target address, wherein the commit instruction is to commit the atomic region.

14. The non-transitory, machine readable medium of claim 8, wherein to optimize the section of program code comprises to optimize the section of code via an optimization technique selected from a group consisting of Partial Redundancy Load Elimination (PRLE), Partial Dead Store Elimination (PDSE), loop optimization, data-flow optimization, code generation optimization, bounds checking elimination, branch offset optimization, dead code elimination, and jump threading.

15. A method for optimizing program code, the method comprising:
    identifying, by a computing device, a section of program code to be optimized;
    demarcating, by the computing device, at least a portion of the section of program code as an atomic region in response to identifying the section of program code to be optimized;
    inserting, by the computing device, conditional commit code at a conditional commit point determined to be within the atomic region; and
    optimizing, by the computing device, the section of program code in response to identifying the section of program code to be optimized.

16. The method of claim 15, wherein demarcating at least a portion of the section of program code as an atomic region comprises: (i) inserting a start transaction instruction at a beginning of the portion of the section of code, and (ii) inserting an end transaction instruction at an end of the portion of the section of code.

17. The method of claim 15, wherein inserting the conditional commit code at the conditional commit point determined to be within the atomic region comprises inserting a conditional commit code to:
    determine a representation of an availability of hardware resources adapted to support transactional execution; and
    commit the atomic region before an end of the atomic region in response to the representation of the availability of the hardware resources indicating insufficient resources to complete execution of the atomic region.

18. The method of claim 17, wherein the conditional commit code is to jump to a branch target address in response to the representation of the availability of the hardware resources indicating insufficient resources to complete execution of the atomic region.

19. The method of claim 18, further comprising inserting, by the computing device, a commit instruction at the branch target address, wherein the commit instruction is to commit the atomic region.

20. The method of claim 15, wherein optimizing the section of program code comprises optimizing the section of code via an optimization technique selected from a group consisting of Partial Redundancy Load Elimination (PRLE), Partial Dead Store Elimination (PDSE), loop optimization, data-flow optimization, code generation optimization, bounds checking elimination, branch offset optimization, dead code elimination, and jump threading.

* * * * *